US010855064B2

(12) United States Patent
Hicks et al.

(10) Patent No.: US 10,855,064 B2
(45) Date of Patent: *Dec. 1, 2020

(54) SYSTEM FOR ELECTRONIC DOORFRAME

(71) Applicant: Tadpole Products, LLC, Cincinnati, OH (US)

(72) Inventors: Ronald J. Hicks, West Chester, OH (US); Gary E. Johnson, Milan, IN (US)

(73) Assignee: Tadpole Products, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,794

(22) Filed: Apr. 12, 2019

(65) Prior Publication Data

US 2019/0326736 A1  Oct. 24, 2019

Related U.S. Application Data

(63) Continuation-in-part of application No. 15/955,998, filed on Apr. 18, 2018, now Pat. No. 10,411,447.

(51) Int. Cl.
*H02G 3/06* (2006.01)
*H02G 15/013* (2006.01)
*H02G 3/10* (2006.01)

(52) U.S. Cl.
CPC ............ *H02G 3/0616* (2013.01); *H02G 3/10* (2013.01); *H02G 15/013* (2013.01)

(58) Field of Classification Search
CPC ...... H02G 3/0616; H02G 15/013; H02G 3/10; H02G 3/083; H02G 3/12; H02G 3/386; E06B 7/28
See application file for complete search history.

(56) References Cited

U.S. PATENT DOCUMENTS

| 3,273,109 | A | | 9/1966 | Moulin |
| 3,472,317 | A | * | 10/1969 | Fowler ................. E21B 23/002 166/335 |
| 3,836,696 | A | | 9/1974 | Gressitt et al. |
| 3,936,126 | A | | 2/1976 | Miller |

(Continued)

OTHER PUBLICATIONS

U.S. Patent and Trademark Office; Search Report and Written Opinion in related International Patent Application No. PCT/US2019/027793 dated Jul. 3, 2019; 15 pages.

*Primary Examiner* — Joshua K Ihezie

(74) *Attorney, Agent, or Firm* — Wood Herron & Evans LLP

(57) ABSTRACT

A system for providing electronic features in a doorframe include a body structure having a top wall, a bottom wall and a plurality of side walls. The walls define an interior space of the body structure. A plurality of ports are formed in the top wall and a plurality of ports are formed in the bottom wall with each port opening into the interior space. One or more of the top wall ports is longitudinally aligned with a respective bottom wall port to form a port pair. A diverter is positioned in the interior space and extends in the interior space from one side wall and toward an opposing side wall. The diverter spans between the port pair. The diverter has a diverter surface that is configured for directing an element that extends through a port of the port pair toward an area in the body structure.

20 Claims, 17 Drawing Sheets

(56) References Cited

U.S. PATENT DOCUMENTS

| | | | |
|---|---|---|---|
| 3,971,894 A * | 7/1976 | Faust | H02G 15/105 174/41 |
| 4,042,291 A * | 8/1977 | Moriyama | F21S 2/00 439/210 |
| 4,152,752 A * | 5/1979 | Niemi | F21S 2/00 362/576 |
| 4,486,620 A * | 12/1984 | Ball | H02G 15/117 174/41 |
| D278,623 S | 4/1985 | Anderson | |
| 4,535,197 A * | 8/1985 | Butler | H02G 15/117 138/166 |
| 4,647,715 A | 3/1987 | Butler | |
| 4,655,379 A * | 4/1987 | Busch | B21B 39/18 226/110 |
| 4,721,830 A | 1/1988 | Dagan et al. | |
| 4,744,622 A * | 5/1988 | Cherry | G02B 6/3801 385/135 |
| 5,017,739 A * | 5/1991 | Hoffman | H01R 4/70 174/138 F |
| 5,066,095 A | 11/1991 | Dekeyser et al. | |
| 5,169,013 A * | 12/1992 | Lammens, Jr. | H02G 3/083 174/650 |
| 5,222,176 A * | 6/1993 | Webber | G02B 6/4427 385/100 |
| 5,261,018 A * | 11/1993 | Suganuma | G02B 6/2835 385/51 |
| 5,266,741 A | 11/1993 | Butler | |
| 5,545,847 A | 8/1996 | Lynes et al. | |
| 5,937,903 A * | 8/1999 | Afshar | F16K 11/0856 137/597 |
| 6,521,833 B1 * | 2/2003 | DeFreitas | F16L 25/0045 174/50 |
| 7,381,893 B2 * | 6/2008 | Kerr, Jr. | H02G 3/125 174/50 |
| 7,824,213 B1 * | 11/2010 | Korcz | H01R 13/5816 174/64 |
| 3,033,058 A1 | 10/2011 | Block | |
| 8,033,058 B2 * | 10/2011 | Block | E04D 13/08 210/162 |
| 8,128,126 B2 * | 3/2012 | Poupore | F16L 41/023 285/131.1 |
| 8,476,541 B1 * | 7/2013 | Kiely | H02G 3/081 174/656 |
| 8,497,424 B2 * | 7/2013 | Castaldo | H02G 3/081 174/50 |
| 8,746,606 B1 | 6/2014 | Murray | |
| 9,057,862 B2 * | 6/2015 | Strasser | G02B 6/4471 |
| 9,231,392 B2 * | 1/2016 | Rogers | H02G 3/30 |
| 9,353,930 B2 * | 5/2016 | Freier | G02B 6/0096 |
| 9,360,676 B2 * | 6/2016 | Corrigan | G02B 27/14 |
| 2005/0034494 A1 | 2/2005 | Meier et al. | |
| 2008/0000097 A1 * | 1/2008 | DiGavero | B25H 7/02 33/528 |
| 2009/0107693 A1 * | 4/2009 | Meyer | H02G 3/086 174/60 |
| 2009/0215326 A1 | 8/2009 | Breen, IV et al. | |
| 2009/0223696 A1 * | 9/2009 | Gawoski | H02G 3/123 174/58 |
| 2010/0033885 A1 * | 2/2010 | Hotchkiss | B29C 39/00 361/56 |
| 2010/0193237 A1 * | 8/2010 | Drane | H02G 3/185 174/482 |
| 2011/0108319 A1 * | 5/2011 | Gauthier | H02G 3/121 174/520 |
| 2011/0192644 A1 * | 8/2011 | Santiago | H02G 3/085 174/520 |
| 2012/0008257 A1 | 1/2012 | Rebers et al. | |
| 2012/0181786 A1 * | 7/2012 | Morris | F16L 41/023 285/131.1 |
| 2012/0238154 A1 * | 9/2012 | Bishop | H01R 4/4836 439/709 |
| 2015/0047897 A1 * | 2/2015 | Zimet | H02G 3/083 174/521 |
| 2015/0188301 A1 * | 7/2015 | Rogers | H02G 3/30 174/535 |
| 2015/0263499 A1 * | 9/2015 | Korcz | F16M 13/02 174/61 |
| 2016/0111816 A1 | 4/2016 | Walker et al. | |
| 2018/0337521 A1 * | 11/2018 | Cerka | H02G 3/083 |

\* cited by examiner

SYSTEM FOR ELECTRONIC DOORFRAME

CROSS-REFERENCE TO RELATED APPLICATIONS

This application is a Continuation-In-Part of U.S. patent application Ser. No. 15/955,998, filed Apr. 18, 2018 (pending), the disclosure of which is incorporated by reference herein.

FIELD OF THE INVENTION

The invention relates generally to doorframes and partially to electronic doorframes for incorporating electronic door hardware and control features.

BACKGROUND OF THE INVENTION

Electronic doors, such as those doors that incorporate electronic door hardware and other features that must be powered and cabled appropriately for operation, are used in various facilities. Generally, electronic doors and the electronic features therein are powered and connected through the doorframe, which is generally considered an "electronic doorframe". Such electronic doors and frames are often utilized in facilities where security and controlled access are important, such as schools, prisons, medical facilities, and other facilities wherein it is desirable to control ingress and egress of a room or facility or to remotely lock and unlock certain doors.

Generally, for electronic doorframes, power lines and other cabling are brought to the door and frame through appropriate electrical conduit located in the walls and ceilings of the facility. The conduit extends from junction boxes proximate to the doorframe, and the cables are delivered to access points around the frame. In some installations, the doorframes might be hollow and are abutted against stud and drywall construction, thus providing space behind the frame for the cabling during initial installation. Doorframes are often abutted against masonry, where the space behind the frame is filled with the masonry units and mortar. In some other installations, the door frames might be pre-wired and then installed and coupled to appropriate cabling and power lines. For example, pre-wired doorframes might present a plug-in connector to then be connected with external cabling. As such, existing doorframes might incorporate various conduit and other elements that are secured in the frame that may or may not be prewired for usage. Any conduit, and possibly cabling and power lines are installed in the factory and then shipped to a site and installed.

Accordingly, existing electronic doorframes and systems provide very little flexibility in being adaptable at the site. Furthermore, because the doorframes are installed and secured against masonry, the wiring would all have to be run and completed before the frame is installed and sealed with the masonry. Once installed, there is very little flexibility in being able to run cabling. Furthermore, it is very difficult to change the configuration of the door electronics once it is installed. For example, it may be desirable to change the electronic hardware or to add additional electronic hardware and features to a door once it is installed, or to incorporate new or updated electronic security hardware devices as they are developed in the marketplace.

Accordingly, the present invention is directed to a system for an electronic doorframe which provides significant improvements over existing designs. Specifically, the system of the invention provides the ability to cable and connect electronic features of the door and the doorframe after initial installation for the future life of the door and frame. Furthermore, it provides the ability to retrofit a door, such as by changing hardware or adding hardware very easily even after the doorframe has been secured with masonry. The inventive system is flexible in the location of the components of the system within the doorframe and provides features which enhance the cabling tasks associated with connecting an electronic doorframe to suitable power sources and other cabling. Accordingly, the present invention provides significant cost savings and flexibility in the installation, use, and retrofitting of an electronic door and an electronic doorframe.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF EMBODIMENTS OF THE INVENTION

Figure 1:
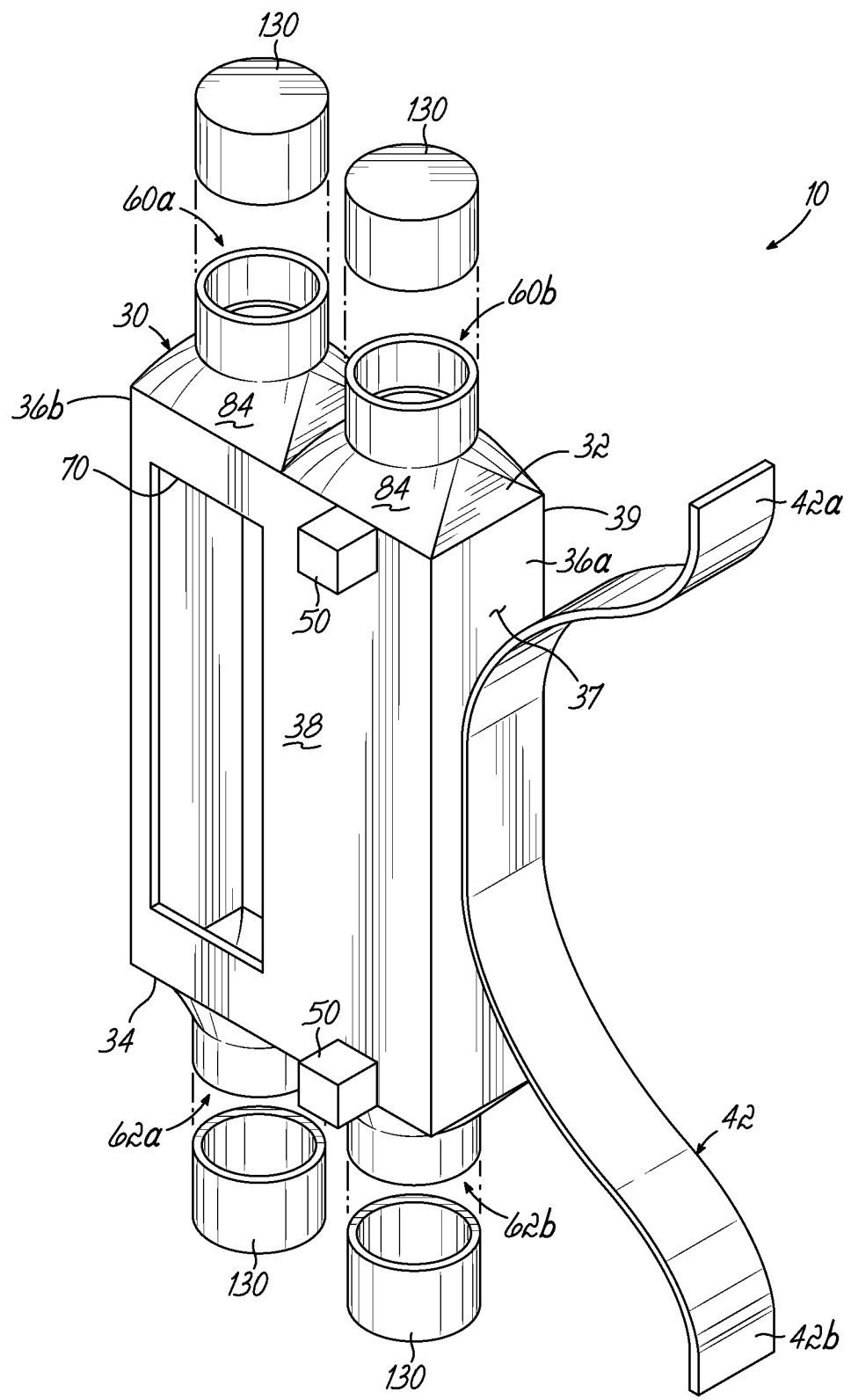
FIG. 1 is perspective view of one embodiment of the invention.
Figure 10:
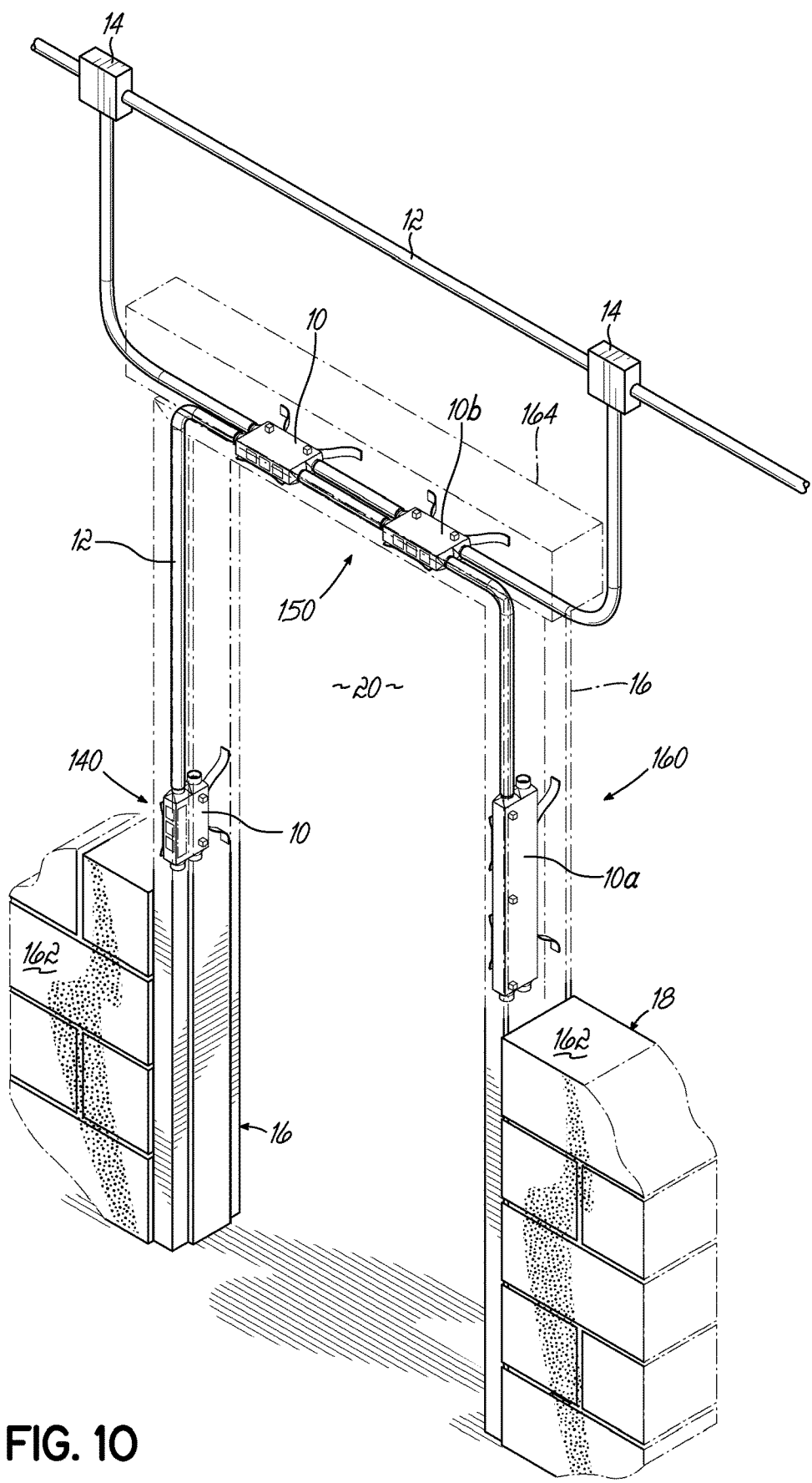
FIG. 10 is a perspective view, in partial cross-section, of embodiments of the invention as incorporated within a doorframe.

FIG. 1 illustrates a system 10 in accordance with the invention for use in a doorframe for providing electronic features in the doorframe. Specifically, the system 10 is utilized inside the doorframe and with the doorframe and provides a transition point for power lines and other wiring and cables (hereinafter "cabling"). The cabling provides power and other electrical signals to electronic components and electronic hardware that are used for a door, such as electronic hinges, electric power transfer components, electronic locks, electronic strike plates, door position sensors, electric door operators (openers and closers) etc. As illustrated in FIG. 10, cabling is often run through electrical conduit 12 and is also coupled through various electrical junction boxes 14 proximate to and around a doorframe 16 and door lintel 164 of a facility to provide power and electrical signals to the doorframe. Generally, the doorframe will include a hollow metal frame structure 16 or frame and will abut against the wall block 18 and will be secured by masonry surrounding a door opening 20.

Figure 6:
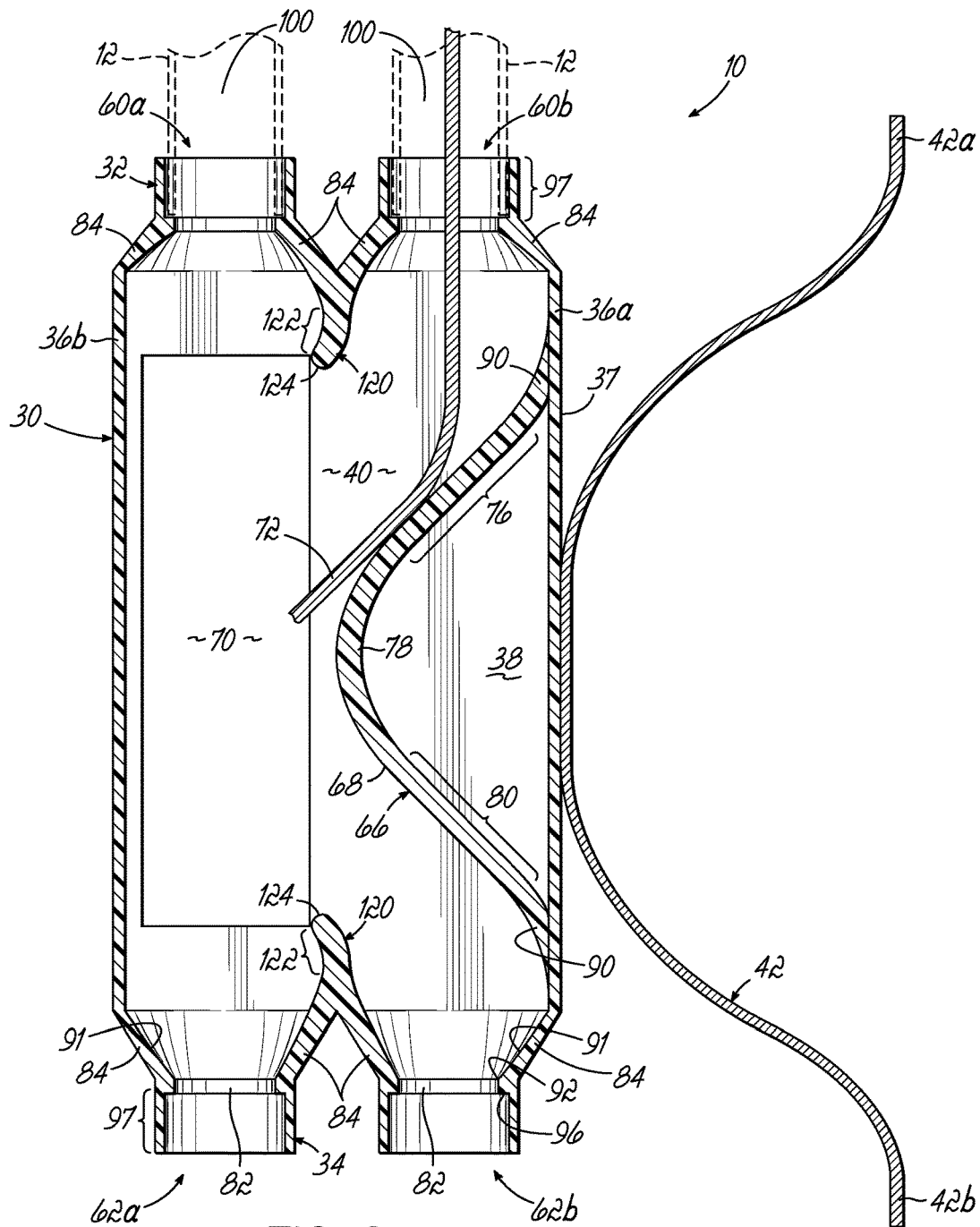
FIG. 6 is a cross-sectional view of an embodiment of the invention.

Returning to FIG. 1, the system 10 provides an interface between wiring within a doorframe as shown in FIG. 10 and the electronic doorframe elements and other electronic elements associated with the door, doorframe or door opening 20. System 10 includes a body structure 30 that has a top wall 32, a bottom wall 34, and a plurality of sidewalls 36, 38. The top wall, bottom wall, and sidewalls define a hollow body structure and an interior space 40, as illustrated in FIG. 6 for example. Any cabling or tools used for running and pulling cabling around the doorframe and extend through the interior space 40 and then back out the interior space through various openings and ports in order to provide the desirable electrical connections. In that way, system 10 provides access to various sources of power, external systems, and exterior electronic devices that interface with system 10, for certain features and functions of a door system as illustrated in FIG. 10.

Figure 3:
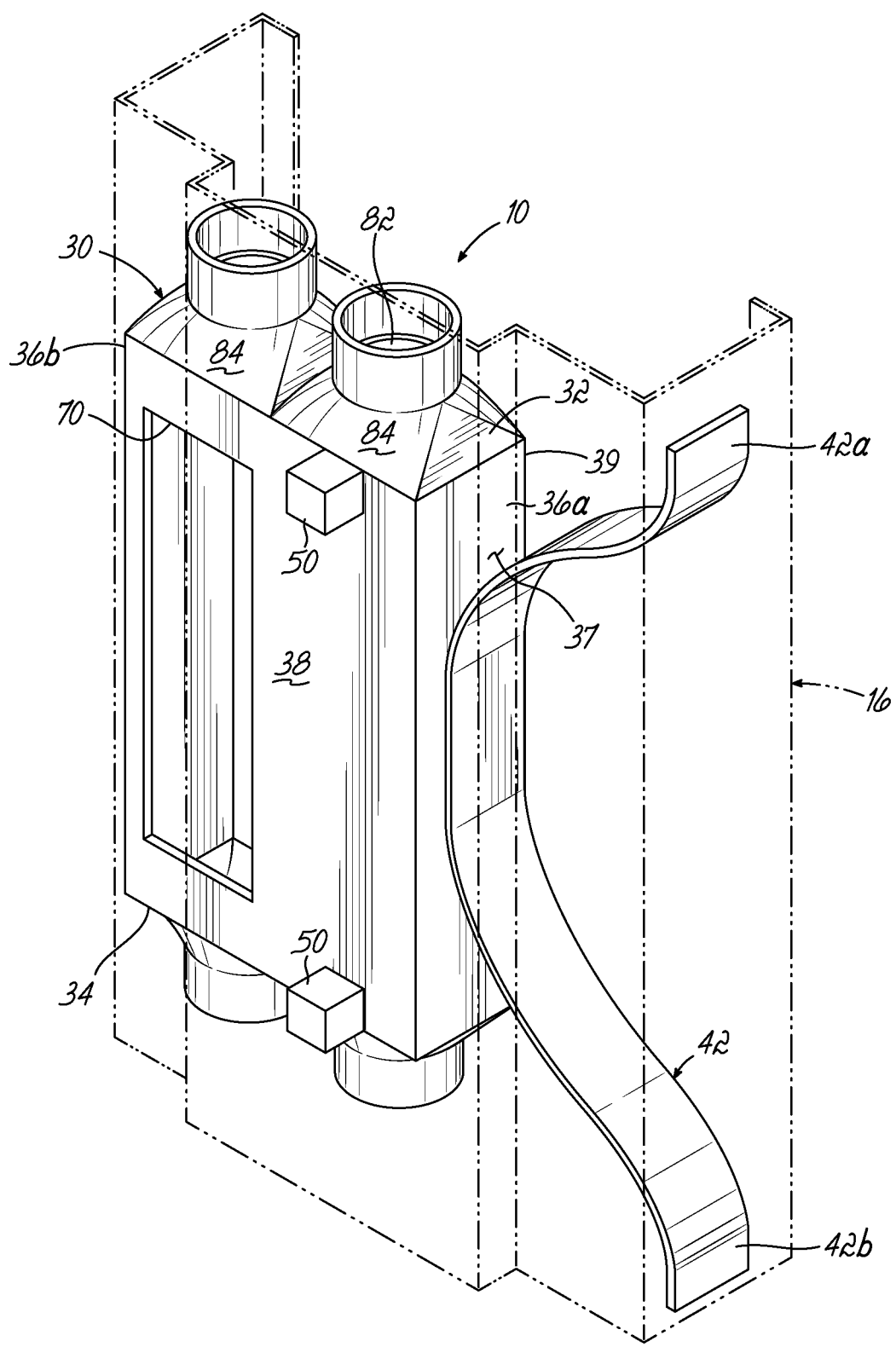
FIG. 3 is a perspective view of an embodiment of the invention incorporated within a doorframe.
Figure 4:
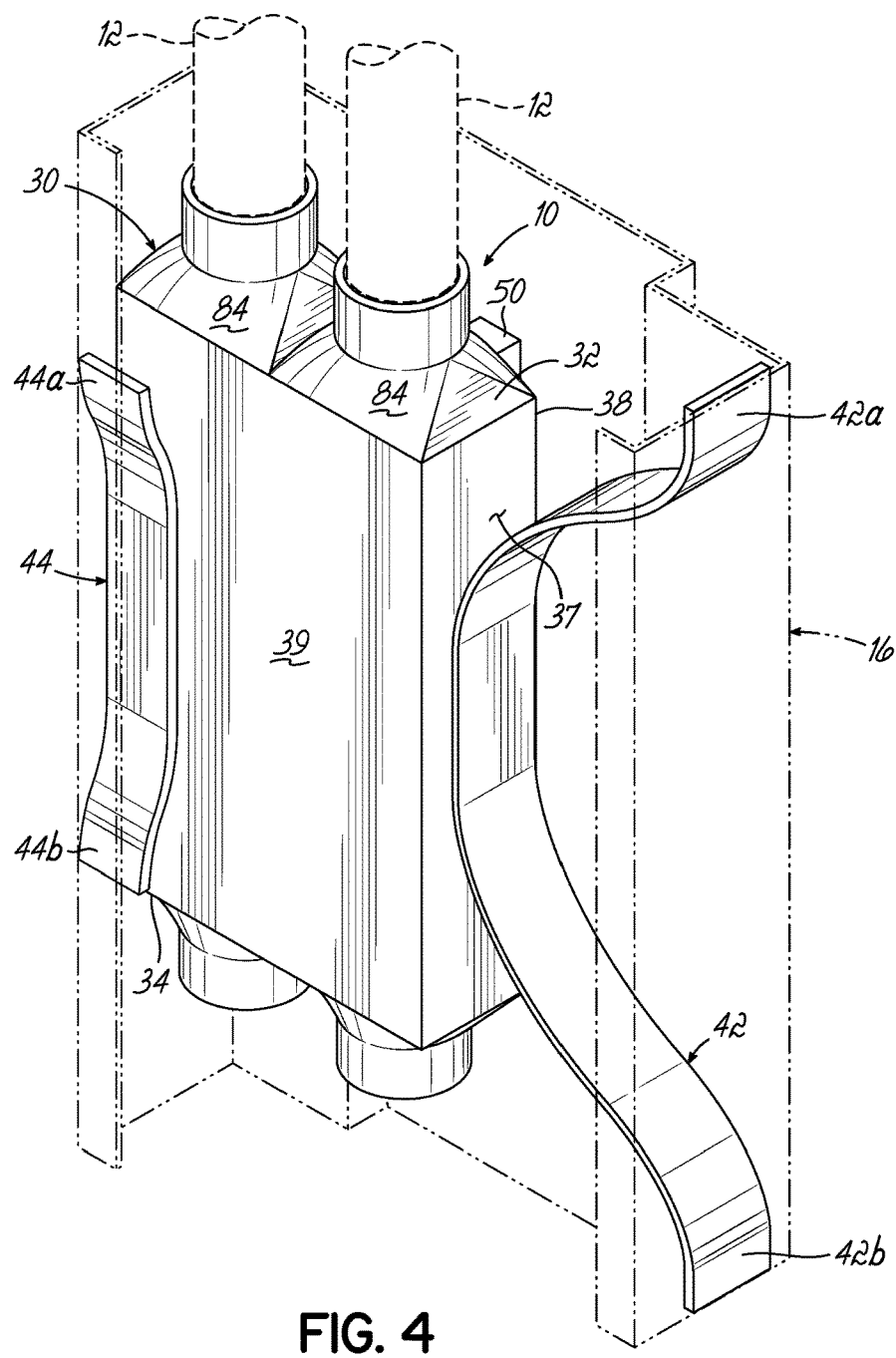
FIG. 4 is another perspective view of the embodiment of FIG. 3.
Figure 5:
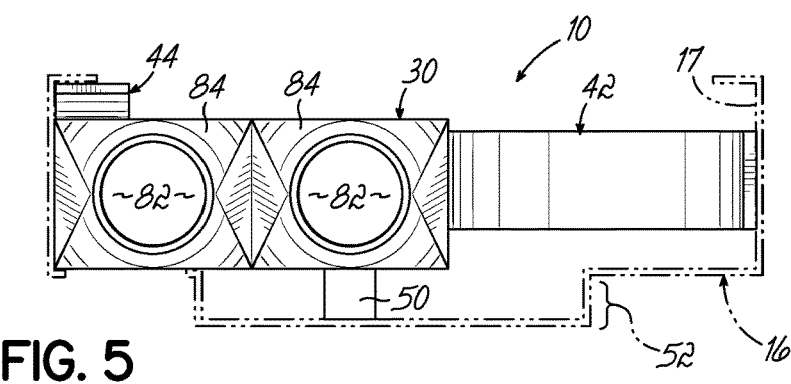
FIG. 5 is a top view of an embodiment of the invention as illustrated in FIG. 3.

In one embodiment of the invention, as illustrated in the Figures, sidewalls 36, 38 are generally planar and thus form a box-like body structure 30. System 10 of the present invention is configured for fitting into and working with a hollow doorframe as having flat or planar walls, as illustrated in FIGS. 3-5. The cross-section of a typical doorframe 16 is illustrated in FIG. 5 and is generally a hollow frame formed of a suitable material, such as metal and is configured to abut up against a masonry wall 18 as shown in FIG. 10. System 10 fits inside of doorframe 16 as illustrated in FIGS. 4-5.

Figure 2:
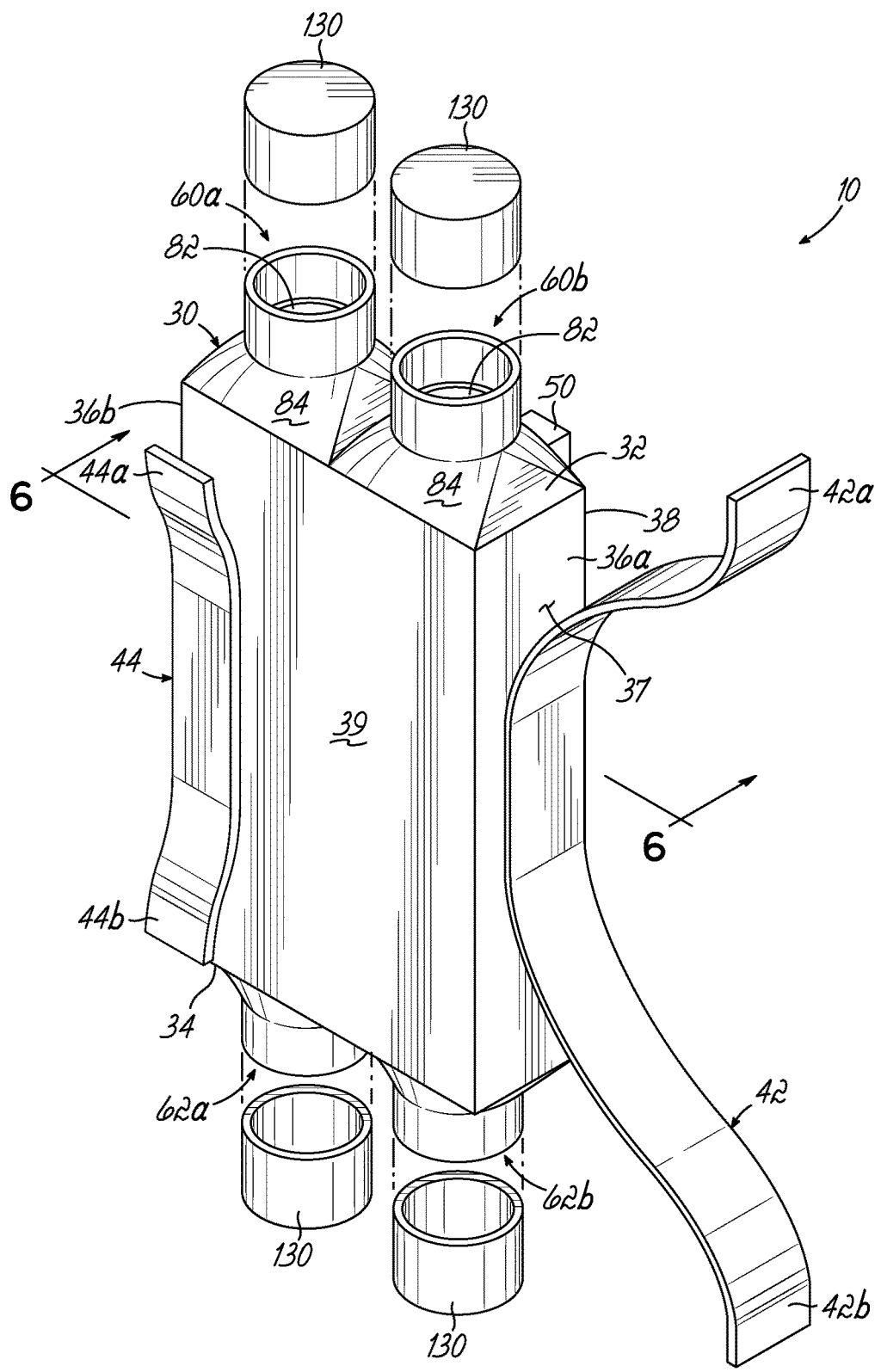
FIG. 2 is another perspective view of the embodiment in FIG. 1.

The system, in one embodiment, incorporates elements for securing the body structure 30 in the frame. As illustrated in FIG. 1, system 10 incorporates one or more spring clips or clip structures 42, 44. The spring clips are coupled with an exterior surface of a sidewall of the body structure and extend away from the body structure sidewall. For example, as illustrated in FIGS. 1 and 2, spring clip 42 is coupled with the exterior surface of 37 of sidewall 36 by a suitable attachment mechanism, such as by being welded or bolted or otherwise secured to surface 37 of the sidewall. Similarly, as illustrated in FIG. 2 spring clip 44 might be coupled to an exterior surface 39 of the sidewall 38 and may be secured in a similar fashion as the spring clip 42. The frame structure 16 includes various flat inner and outer surfaces depending on the shape of the frame structure. Generally, each of the spring clips will include one or more legs 42a, 42b, or 44a, 44b, that flex against one or more of the inner surfaces 17 of frame structure or frame 16 to secure the body structure 30 within the frame.

In accordance with one embodiment of the invention, as illustrated in FIG. 5, for example, the spring clips 42, 44 may be located on sidewalls that are generally orthogonal or at 90° to each other in order to engage the frame 16 in two orthogonal directions to secure the body structure. That is, one spring clip may be engaged with the frame for providing a securing force from side-to-side and another might be oriented to provide a securing force from front-to-back with respect to body structure 30, depending upon how those directions are defined with respect to the doorframe 16. As illustrated in FIG. 5, spring clip 42 pushes the body structure 30 against the side of the frame whereas spring clip 44 pushes the body structure against the front of the frame. For further positioning system 10 within frame 16, one or more spacers 50 might be used to also secure the body structure 30 against the frame 16. The body structure may be formed of a suitable material such as metal or plastic.

As illustrated in FIGS. 3-5, generally a doorframe will include a doorstop structure 52 that extends into the door space 20 from the frame. That is, the frame forms a rabbet edge to form doorstop 52. Spacers 50 may extend into doorstop 52 and further secure in position the body structure 30 therein for securing its location and position within the doorframe 16. Generally, the spring clips 42 are formed of a suitable flexible structure such as metal or plastic. The spacers 50 may be formed of a suitable material that is rigid or flexible as appropriate for ensuring the proper positioning and securement of the body structure 30 in the frame. In one embodiment, the spaces 50 are formed as part of the body structure. In another embodiment, they are separate from the body structure. As may be appreciated, the spring clips and spaces may be sized accordingly depending on the size of the body structure and doorframe.

In another embodiment of the invention, the system may be secured in other ways to the frame. For example, system 10 and particularly body structure 30 may be welded to the frame or might be secured by being bolted or screwed into the frame. In other embodiments, adhesives might be used to secure the system into the frame. In still another embodiment, the system 10 or elements thereof might actually be formed as part of the frame rather than being held against it. So, the present invention and its use in a doorframe or as part of a frame is not limited to the embodiments shown in the illustrations. As such, the system 10 might include the frame and one or more body structures as a generally unitary element for installation in a building or structure.

The system 10 of the present invention provides a specific ability to incorporate electronic features into a doorframe and door structure and further provides the ability to direct the appropriate cabling into position for being coupled with one or more of the electronic components. Furthermore, the present invention provides a way to retrofit and add electronic features to a doorframe after installation of the doorframe and door have occurred. To that end, the system 10 incorporates various elements for guiding and directing elongated structures, such as lengths of cable as well as tools for fishing the cable (e.g., Fish tape), into the walls and in and around the doorframe.

In accordance with one feature of the invention, a plurality of ports 60a, 60b are formed in the top wall 32 of the body structure. Also, a plurality of ports 62a, 62b are formed in the bottom wall 34 as illustrated in FIGS. 1 and 6. Each of the ports opens into the interior space 40 of body structure 30. More specifically, respective ports in the top wall, such as top wall ports 60a, 60b longitudinally aligned in the body structure with respect to bottom wall ports 62a, 62b thus forming a plurality of port pairs at the top and bottom of body structure 30. For example, port 60a is longitudinally aligned with 62a to form a port pair and port 60b is longitudinally aligned with port 62b for forming another port pair. The embodiment illustrated in the figures shows two port pairs, although a lesser or greater number might be implemented in the invention.

The present invention further includes various features for directing any cabling or cabling tools through the interior space and into and through various ports depending upon where the cabling is to be directed. To that end, system 10 incorporates a diverter structure 66 or diverter as illustrated in the cross-sectional view of FIG. 6. Diverter 66 is positioned in the interior space 40 and extends in the interior space from one sidewall 36a and toward another sidewall 36b opposite or opposing sidewall 36a. Diverter 66 also spans along the length of body structure 30 between a port pair, such as port pair 60b, 62b as illustrated in FIG. 6. The diverter 66 has a diverter surface 68 configured for directing an element that extends through a port of the port pair toward and area in the body structure. That is diverter 66 diverts cabling/tools passing through the ports 60b, 62b in different directions. The diverter 66 is configured for directing cabling/tools that come through either port 60b or 62b over to an area in space 40 that overlaps with opening 70 that is formed in the body structure 30. Referring to FIG. 1, opening 70 might be formed in one of the sidewalls 38 to provide access to the interior space 40. For example, referring to FIGS. 1 and 6, opening 70 is formed in sidewall 38 to generally align with or extend between the port pair 60a, 62a but is spaced from port pair 60b, 62b. Since opening 70 will provide access to the interior space 40, it is desirable that cables and/or tools that are being pushed or pulled through the conduit are directed to the opening 70 for easier access by an installer. To that end, the diverter 66 will guide and direct cables/tools entering the interior space 40 through port 60b or 62b toward opening 70. Similarly, any cables/tools directed though opening 70 and toward the side of the body structure containing ports 60b, 62b, will be diverted in the direction of those ports.

For example, as illustrated in FIG. 6, an exemplary cable 72 is illustrated passing through port 60b and being directed toward opening 70 by the diverter 66. As illustrated, the diverter works in both directions for cables and tools being directed through the various ports to intercept the diverter 66. In one particular embodiment of the diverter 66 as illustrated, the diverter is in the forma of a wall that extends in the interior space 40. In another embodiment, the diverter might be a solid structure that forms the shaped surface as illustrated. Diverter 66 has a surface 68 that slopes from one sidewall, such as 36a proximate a port, such as port 60b along a sloping portion 76 toward the opposing side wall 36b. The diverter surface 68 then has a peak 78 and slopes back along another sloping portion 80 to the sidewall 36a and proximate to the other port 62b. In that way, the diverter works in both directions so that any cable/tool entering port 60b or 62b is diverted or directed toward opening 70. In that way, the end of the cable or tool will then be readily accessible to an installer. Any cabling/tool entering through opening 70 can be guided to the ports 60b, 62b by diverter 66. Cable 72 may be coupled to suitable electronic hardware. Alternatively, the end of the cable 72 might be directed to one of the other ports to continue through system 10 to its termination point. The diverter 66 is formed as a generally smooth, curved element wherein the transition sections 76, 80 and the peak 78 all form one smooth curve that extends from the sidewall 36a toward sidewall 36b, then back to sidewall 36a to provide diversion of elements entering or exiting port 60b, 62b.

In accordance with another feature of the invention, each of the ports 60a, b and 62a, b as illustrated in FIG. 2, and FIGS. 5-6 will include an opening 82. A transition portion 84 is formed around and leads to the opening. The transition portion is a slope transition portion, as illustrated, and slopes from the interior space 40 of the body structure to the port opening 82. Depending on the construction of the top wall 32, the sloped transition portions may have interior surfaces that are flat and angled, or they may curve more smoothly toward the openings 82. The slope transition portions 84 are configured for guiding the end of a cable or tool toward and into the opening 82 and thus out of the respective port without getting blocked or otherwise hung up within the interior space of the body structure 30. In that way, cables may be pushed or pulled through the various ports with greater ease and efficiency without getting hung up. In one illustrative embodiment, as shown in FIG. 6, the termination points 90 for the diverter terminate generally proximate to various sloped transition portions 84 at the ports. Such location further ensures a smooth transition between cables being moved through the interior space that engage the diverter 66 and one or more of the sloped transition portions 84.

Figure 6A:
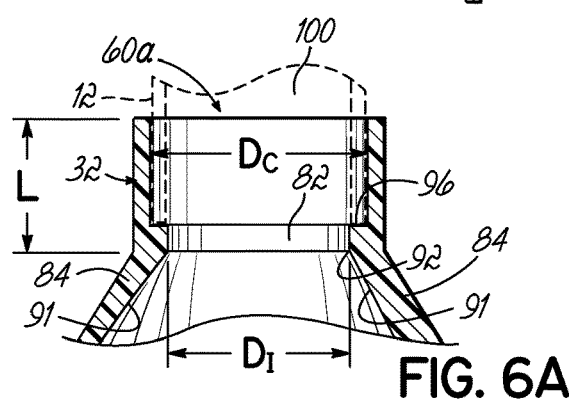
FIG. 6A is an additional cross-sectional view of an embodiment of the invention.
Figure 7:
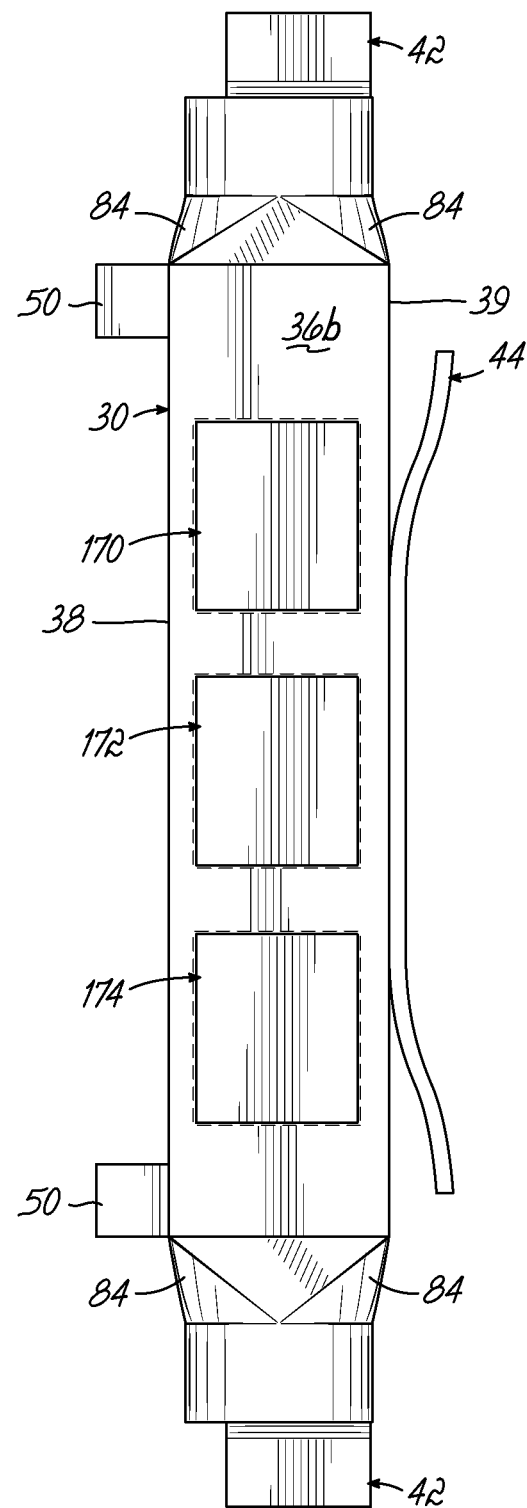
FIG. 7 is a side view of another embodiment of the invention.

Referring to the cross-sectional view of FIG. 6, the inner surface 91 of the sloped transition portion 84 is generally smooth. In one embodiment, the inner surface may be essentially in the form of a smooth conical surface that tapers or transitions to the opening 82. That is, the inner surface 91 transitions smoothly to the beginning 92 of the opening 82 so that there are no edges or discontinuities presented to a cable or tool that is moving into respective ports. The openings have an inner diameter $D_I$. On the other side of the opening 82 the port increases in diameter to a conduit diameter $D_c$ to receive the end of conduit 12, depending upon the size of the conduit. More specifically, the port includes a collar portion 97 that is configured for receiving an end of the electronic conduit. The collar 97 may be formed as part of or an extension of body structure 30. The difference in diameter or size between $D_I$ of the opening 82 and $D_c$ for the collar portion 97 of the port that receives the conduit end provides a seat 96 that stops the insertion of the conduit end into the port opening and thus seats the conduit in the port. Referring you FIG. 6A, the inner diameter $D_I$, in one embodiment of the invention, is essentially sized to be close to or similar to the inner diameter of the electrical conduit. In that way, a further smooth transition is provided between the interior space 40 and the interior space 100 of the conduit as illustrated in FIGS. 6 and 6A. According to the embodiment of the invention, the system 10 and the various elements, such as the ports 60a-62b can be configured for receiving ½ inch conduit or three-quarter inch or larger conduit. The system of the invention can be utilized with PVC or metal conduit as appropriate. Generally, the collar portion 97 of the body structure 30 for the ports 60a-62b would it be dimensioned a suitable length L for providing a sufficient securement and proper seating of the conduit end as it transitions into the body structure 30.

In accordance with another feature of the invention, a transition wall 120 is positioned between two ports of the plurality of ports that are formed in one of the top wall or the bottom wall. The wall 120 extends into the interior space 40 for separating the ports beyond the sloped transition portions 84. The transition wall 120 provides further direction to a cable or tool that is inserted in the opening 70 and directed to one of the respective ports. To that end, portion 122 of the wall 120 may be angled or sloped toward the opening 70 to further facilitate directing a cable or tool from the opening and into the direction of the port 60b or 62b. As illustrated in FIG. 6, the transition wall 120 is positioned at the top of the body structure as well as the bottom of the body structure. The angles portion 122 angles away from the diverter and expands the distance between the diverter 66 and the walls 120 so that the cable or tool may be directed into a port 60b, 62b. This further increases the ease in which the ports that are more distant from opening 70 may be accessed. The walls 120 also include a curved or rounded end 124 for providing protection and smooth traveling of a cable or tool, such as between the two bottom wall ports 62a, 62b. For example, it may be desirable to receive a cable or tool into the body structure through port 62a, and then direct that cable or tool back out of the system through port 62b. As such, the cable or tool would have to be bent over the wall 120 to extend between the port 62a, 62b. The curved end 124 allows for cable or tool to transition between the ports and to wrap around the end 124 without causing damage or breakage in the wiring or the tool.

Depending upon the installation and use of the system 10, as illustrated in the Figures, one or more caps 130 may be implemented with the system in order to cover the ports and the openings defined thereby and to keep mortar and other debris out of the body structure and interior space. Of course, the caps 130 would not be used when cables extend through the ports and into and through the body structure 30.

Referring again to FIGS. 3-5 and 10, the system 10 of the invention will generally be installed into a doorframe 16, which maybe a hollow metal frame structure as is noted. Together, systems 10 and the frame structure from an electronic doorframe. The various spring clips 42, 44 will generally be configured and operable to hold the system 10 in place within a doorframe 16. In accordance with one aspect the invention, one or more of the inventive systems 10 may be incorporated into an electronic doorframe. As may be appreciated, the body structure 30 of the system may be configured appropriately to be utilized with a number of different door frames. Also, the body structure 30 may be sized and configured appropriately to be utilized with a number of different electronic features within the door.

Figure 9:
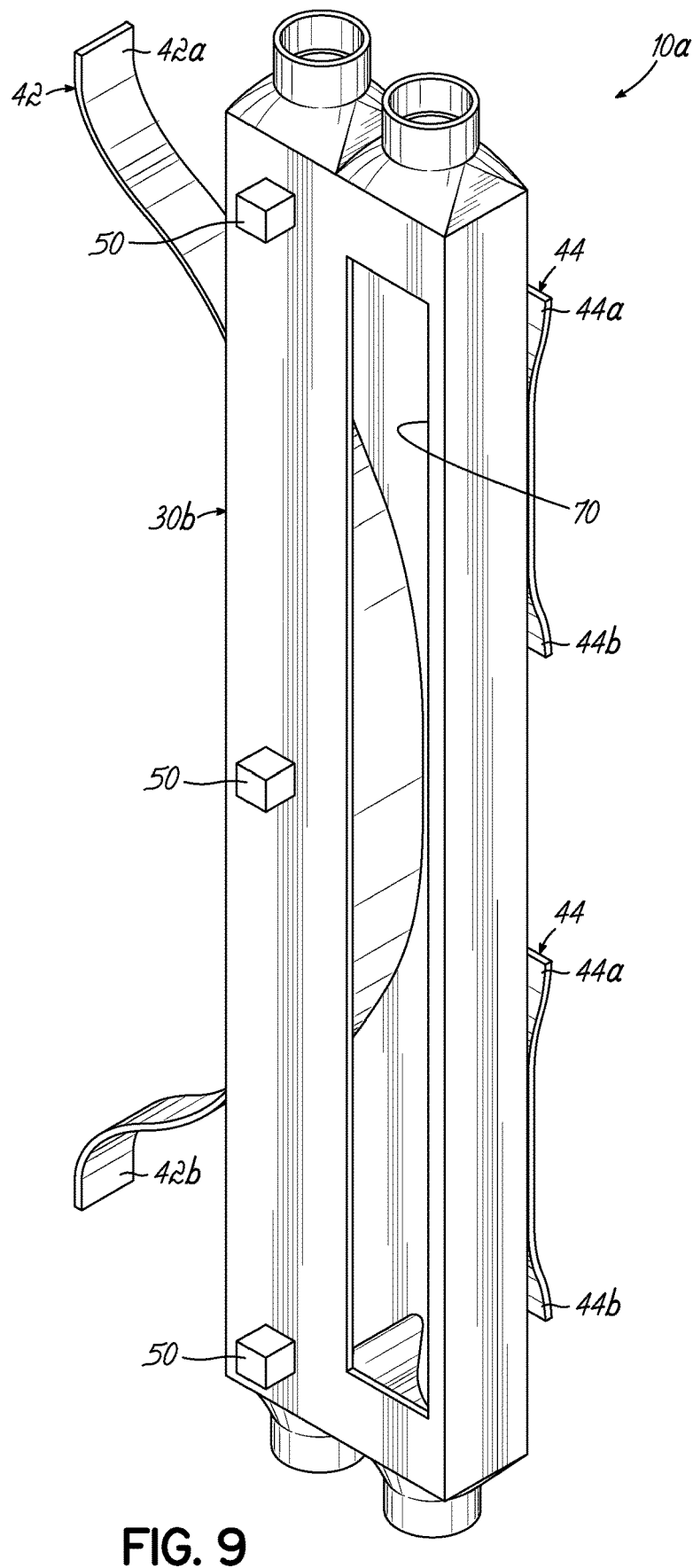
FIG. 9 is a perspective view of another embodiment of the invention.

For example, referring now to FIG. 9, some door installations and electronic features may require a longer body structure as shown in system 10A of FIG. 9. In such a structure, multiple clips such as clips 44 might be implemented along the longer sidewalls of the body structure 30a. A single clip 42 is illustrated however, on the outside wall multiple clips 42 might also be implemented. Furthermore, additional spacers 50 might be utilized as well.

Turning again to FIG. 10, multiple systems might be incorporated into an electronic doorframe 16 as illustrated. The systems 10 may be incorporated into an electronic doorframe 16 on the top of the doorframe or the side of the doorframe as shown, depending upon the electronic feature to be incorporated. For example, one might be positioned at the strike plate of the door for the use of an electronic strike or electronic lock proximate to a side 140 of the frame. Alternatively, at the head of the frame 150 one or more systems 10 might be utilized such as to accommodate a door position switch or door sensor. Still further, to accommodate an electric power transfer positioned proximate to the inside of the door 160 a system 10a might be implemented (See FIG. 9) to accommodate such hardware.

As it would be understood by a person of ordinary skill in the art, the present invention is not limited to the number of systems that might be incorporated within a doorframe for accommodating electronic features. As it will be understood, various openings are formed in a frame 16 to align with the openings 70 within each of the systems 10. Those openings will be covered by the appropriate electronic hardware used in the doorframe. If particular hardware is not utilized, but a system 10 is in place and the frame has a respective opening, a covering plate, such as a blank metal plate might be utilized that fits flush within the surface of the frame for covering the frame opening as well as the opening 70 within the systems 10. For example, a system 10 might be installed, but not used immediately. The system would be available for a future installation of electronic hardware. In that way, the system 10 of the invention provides expandability within an electronic doorframe and also provides the ability to retrofit the frame for different doors and different electronic feature combinations and scenarios.

Accordingly, a frame utilizing systems 10 of the invention may be installed regardless of if power is currently run to the frame. If no electronic features are currently utilized, the cover plates will be used, and the doorframe will perform as any other frame. However, at any time, power can be run in the future to any and all devices to virtually handle the configurations needed. Additionally, utilizing the invention, doors that have some electronics that are installed originally can then later be changed, replaced or updated with new hardware and devices and new appropriate wiring within the doorframe. The systems 10 of the invention provide for cabling to be fished through the various body structures 30 and conduit 12 by virtue of the smooth transitions and pathways that are presented within the systems 10 for the cabling and the tools used to fish the cabling. Referring again to FIG. 10, cabling might be run through conduit 12 and through junction box 14 and then down to engage systems 10 at the head 150 of the frame. From there, power might then be delivered to the systems 10 at side 140 and the system 10a at side 160 of electronic frame. The frame can then be installed within a suitable wall 162 and under door lintel 164.

Figure 8:
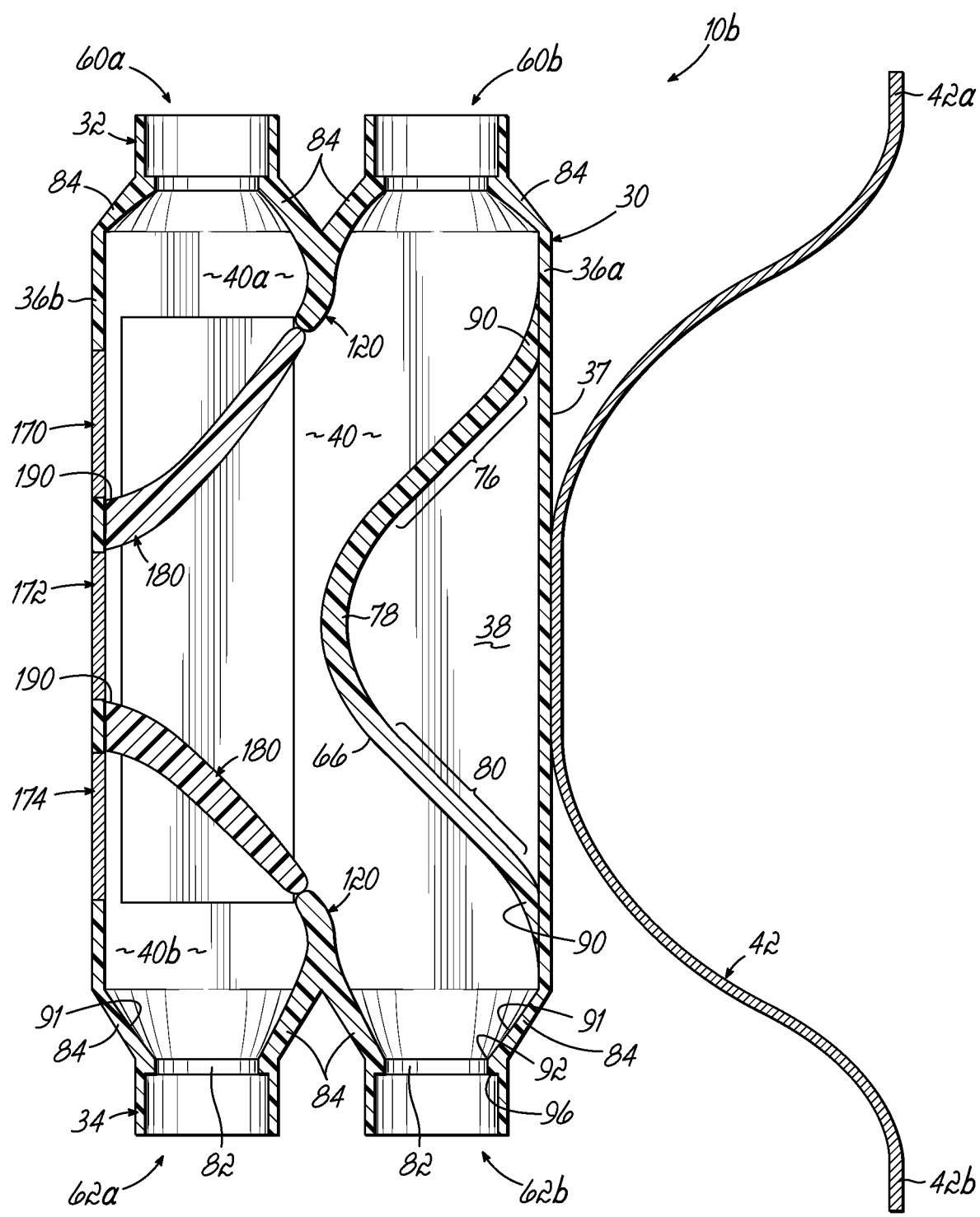
FIG. 8 is a cross-sectional view of another embodiment of the invention.

In accordance with another embodiment of invention, it may be desirable to segregate certain of the cables within the interior space 40 as they may be directed through different conduit and for different purposes. For example, it may be desirable to segregate low-voltage cabling from higher voltage power cables. FIG. 8 illustrates another embodiment of the system of the invention. System 10b incorporates a body structure 30b which is similar in my regards to body structure 30 as illustrated in FIG. 1. However, it incorporates additional features depending upon the use of the system 10b. For example, in addition to opening 70, body structure 30b incorporates additional openings, for example, additional openings 170, 172 and 174 might be incorporated into the side wall 36b. Such openings 170, 172, 174 might be provided by the way of knockout body sections that could be pushed out or otherwise removed as needed to provide one or more of the additional openings. For example, referring to FIG. 10, one of the systems 10 located within the top of the frame might be system 10b which incorporates the additional openings. Such a system, for example might be utilized for providing both a high-voltage pathway and a low-voltage pathway through body structure 30b.

To that end, system 10b further includes one or more separation walls 180. The separation walls are configured to extend from the inside surface of side wall 36b and into the interior space 40. In one embodiment, as illustrated in FIG. 8, the separation walls 80 extend from the interior of sidewall 36B toward the walls 120 to segregate portions of the interior space proximate to one of the ports. For example, as illustrated in FIG. 8, one separation wall 180 is configured to have a length suitable such that it touches or ends very close to wall 120 and thus segregates interior space 40 into a smaller space 40a approximate to port 60a. Similarly, another wall 180 along with wall 120 might form a smaller segregated interior space 40*b* proximate to port 62*a*. Then the remaining interior space 40 would span between ports 60*b* and 62*b*.

In accordance with the embodiment illustrated in FIG. 8, each of the openings 170, 172, 174 might be positioned in sidewall 36*b* to provide access to the segregated interior spaces 40*a*, 40*b* and 40. In one use, low-voltage cables might be installed or accessed through opening 172 and space 40 that is in communication with ports 60*b* and 62*b*. Then separate high voltage cables might be accessed or installed through the openings 170 and 174 that respectively access interior spaces 40*a*, 40*b* and ports 60*a*, 62*a*. In that way, high-voltage and low-voltage cables may be segregated. In system 10*b* and directed to other systems and electrical hardware as necessary.

In accordance with one feature of the invention, the separation walls 180 are removable. For example, at the point of connection of 190 of the walls 180 on the inside of sidewall 36*b*, the walls 180 might be weakened so as to be snapped off away from wall 36B and removed to allow access through openings 170, 174 to one of the ports 60*a*, 62*a* through the interior space 40. That is, the walls 180 might be removed to thus provide an arrangement similar to the embodiment illustrated in FIG. 6.

Alternatively, the walls 180 may be separate pieces that may be removably secured to the inside of surface wall 36*b*, using an appropriate securement mechanism (not shown) when they are desired. For example, the walls might be snapped into place on the inside of wall 36*b*. As such, if it is desirable to segregate or separate certain portions of the interior space 40, the various knockout sections of sidewall 36*b* might be removed and the walls 180 might be snapped into position or otherwise secured on the interior surface of sidewall 36*b* to form separate interior space portions as illustrated in FIG. 8. As shown in FIG. 8, the walls 180 might be angled or cured from wall 36*b* toward wall 120. The surface of the walls 180 might be configured to provide a smooth transition for cables and tools that are directed through interior space and that would come into contact with wall 180 from either side of the wall. For example, cables and tools directed through interior space 40 might be guided by one sidewall 180 and diverter wall 66 to one of the ports 60*b*, 62*b*. Alternatively, the other side of wall 180 might direct cables or tools in a smooth transition between the openings 170 and 174 and respective ports 60*a*, 62*a*.

Accordingly, the systems of the invention in combination with frame 16 provide access to cables for providing electronic features within the doorframe. The systems provide not only the necessary access to the cabling for new installation, but also provide the ability to retrofit doors by providing quick to the systems, conduit, and the interior of the doorframe. Cables and tools, such as a fish tape, may be smoothly directed through the body structures of the various systems and may be readily accessed and further directed into other conduit and other systems for interconnecting all the various electronic features and hardware within an electronic doorframe and door. The system of the invention may also be implemented at various positions around a doorframe for accommodating different electronic features and hardware. The retrofit aspects of the invention provide the ability to add hardware after the initial installation of the doorframe or to reconfigure the doorframe after it has been installed. The doorframe does not have to be removed, and masonry around the doorframe does not have to be significantly disturbed for directing cable to where it is needed or retrofitting the doorframe after installation.

Figure 11:
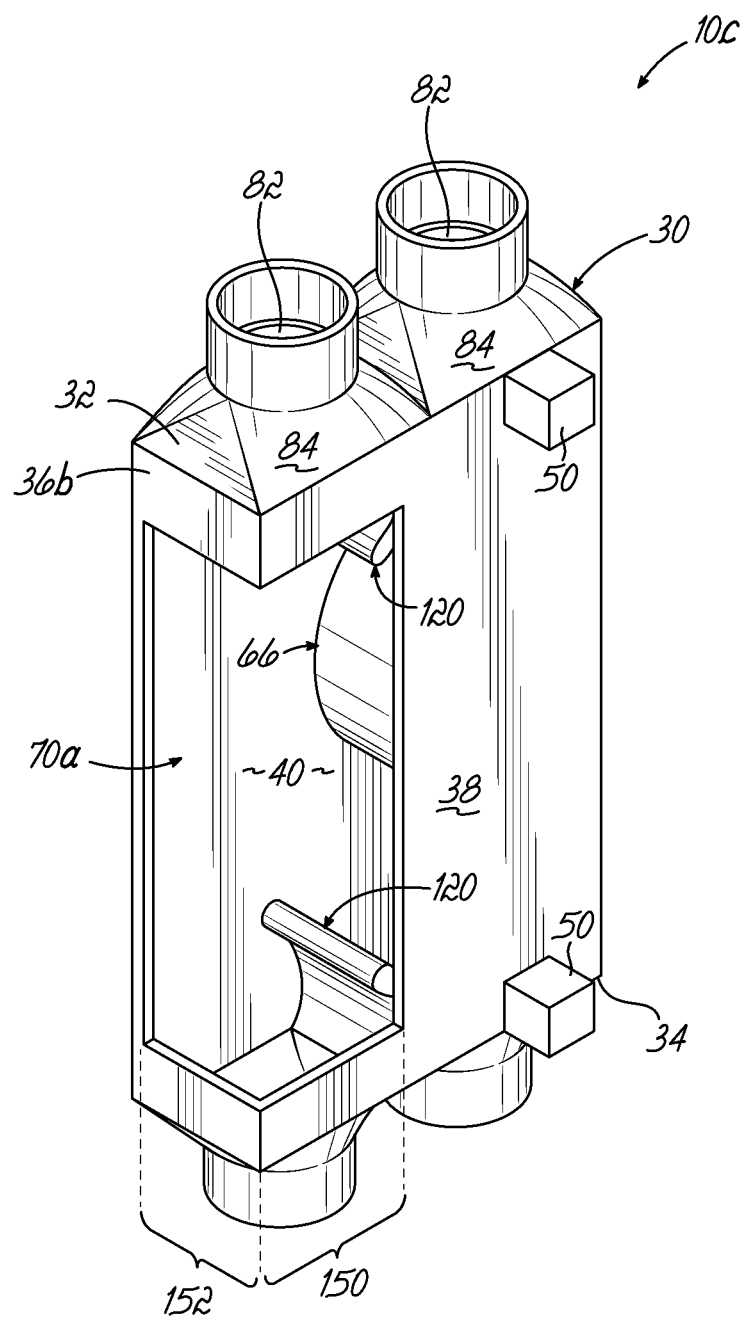
FIG. 11 is a perspective view of another embodiment of the invention.
Figure 12A:
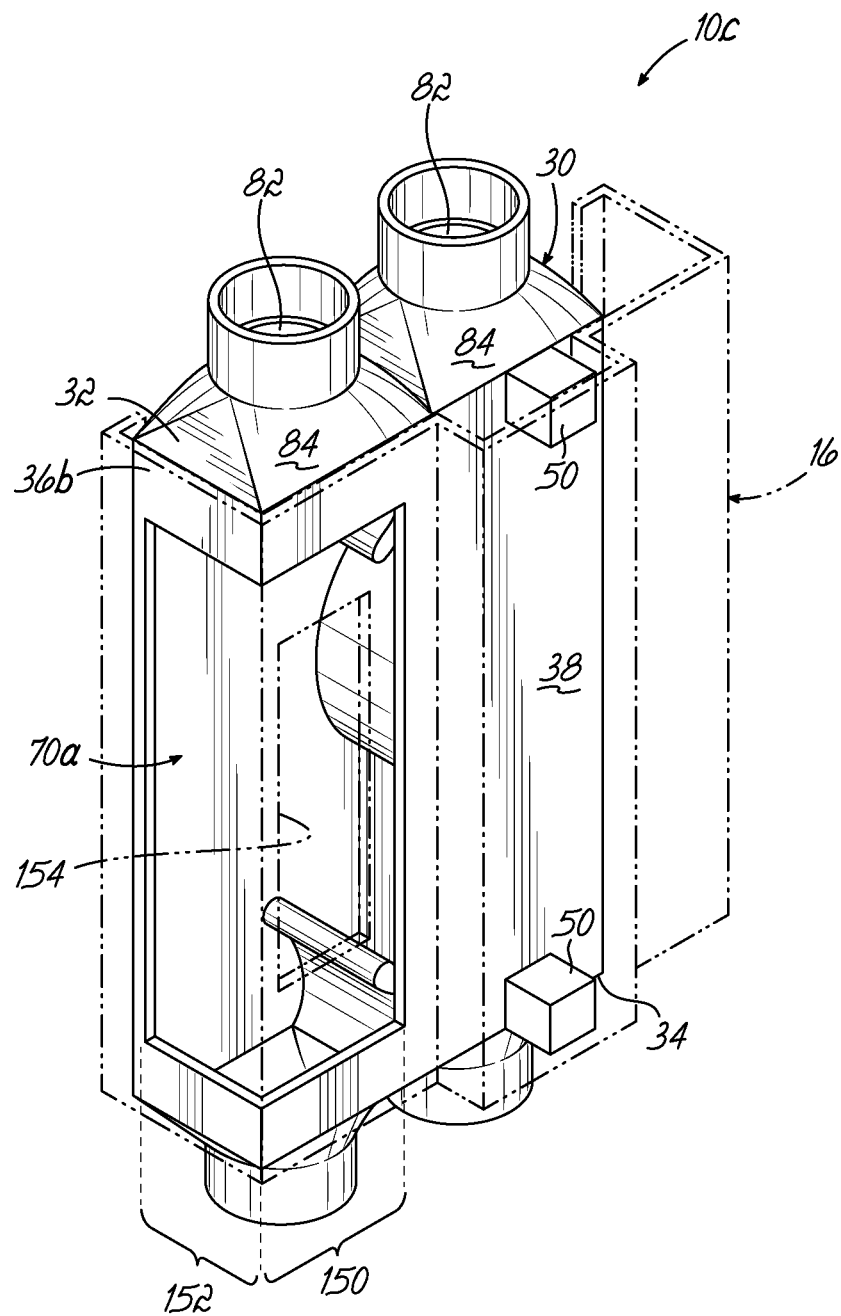
FIG. 12A is a perspective view of an embodiment of the invention incorporated within a doorframe for a particular installation.
Figure 12B:
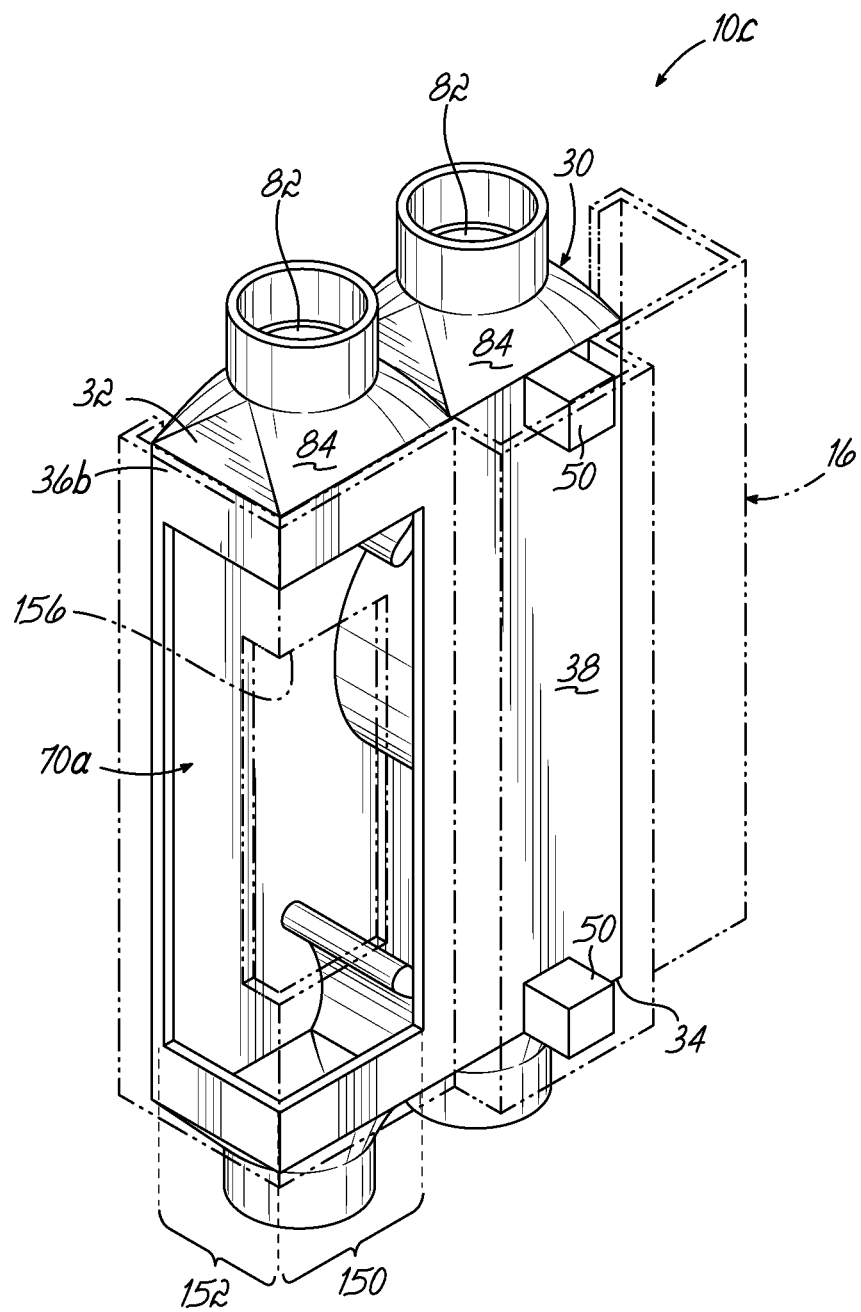
FIG. 12B is a perspective view of an embodiment of the invention incorporated within a doorframe for another installation.
Figure 12C:
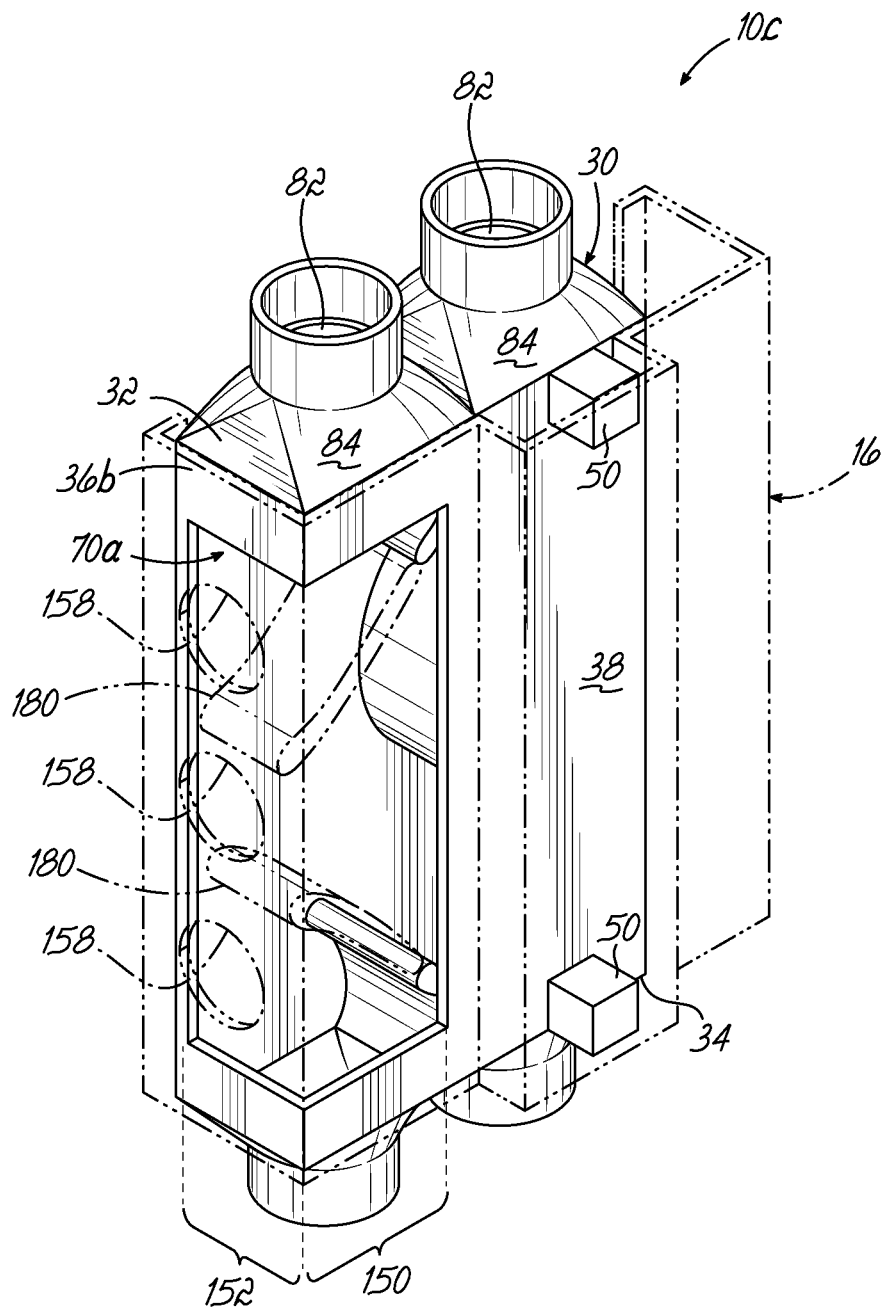
FIG. 12C is a perspective view of an embodiment of the invention incorporated within a doorframe for another installation.

FIGS. 11-12C illustrate an alternative embodiment of the system of the invention. System 10*c* shares various of the features of other systems 10-10*b* as described and includes an alternative opening 70*a* that is formed in multiple sidewalls of the body structure for accommodating various door electronics depending on the installation. Specifically, the opening 70*a* extends or is formed into both sidewall 38 and sidewall 36*b* and includes an opening portion 150 located in the sidewall 38 and an opening portion 152 located in the sidewall 36*b*. Depending on how the opening 70*a* is used and what electronics are installed, any unused portion of the opening might be covered by remaining portions of the faces of the frame rather than covering plates. The opening portion 150, for example, might be utilized similar to opening 70 as illustrated in FIG. 1, such as for electronics like a power transfer arrangement in the side of the frame or a door position switch in the head of the frame. In that case, the portion 152 is covered by part of the frame 16 as shown in FIG. 12A. Specifically, an opening 154 in the frame 16 might overlie the opening portion 150 while the frame covers portion 152.

In alternative uses, such as for installations that might require openings in sidewall 36*b*, the opening 70*a* can accommodate such arrangements as well. For example, as illustrated in FIG. 12B, the opening 156 in the frame might coincide with both portions 150, 152 of the opening 70*a* if necessary, for installation of some electronic features, such as an electric strike element. Any remaining parts of the portions of opening 70*a* that are not used will be covered by the respective faces of the frame 16 as shown in FIG. 12B.

Furthermore, as illustrated in FIG. 12C, the system 10*c* can be used with opening portion 152 providing access into the body structure from the side, similar to the arrangement as illustrated in FIG. 8. Referring to FIG. 12*c*, one or more openings 158 in the frame 16 will coincide with the opening portion 152 and can provide the necessary access to the body structure that might be needed, for example, when using an electric closer element on the face of the frame at the head of the frame. In such an arrangement, there might be openings 158 that are dedicated for 110 Volt cabling and others for low voltage cabling as discussed with respect to FIG. 8. In such an arrangement, the separation walls 180 might be used to segregate the interior space 40 as discussed. The other portion 150 of the opening 70*a* might be covered by a portion or face of the frame 16 as shown. Accordingly, the embodiment of system 10*c* might be used and take advantage of faces of the frame to cover selective portions of the opening 70*a* depending on the electronic installation scenario.

Figure 13:
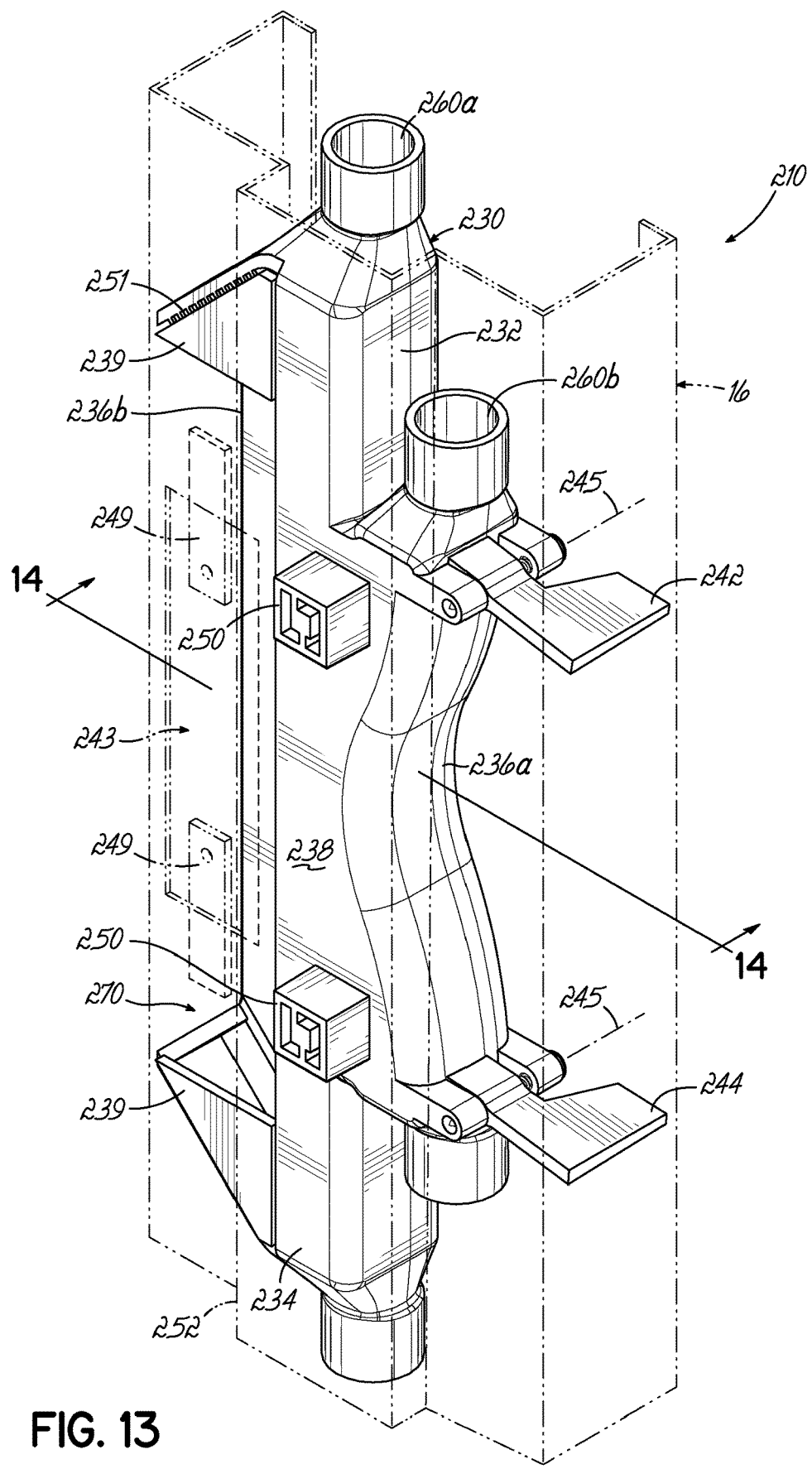
FIG. 13 is a perspective view of another embodiment of the invention incorporated within a doorframe.

FIG. 13 illustrates another system 210 in accordance with the invention for use in a doorframe for providing electronic features in the doorframe. The system 210 is also utilized inside the doorframe and with the doorframe and provides a transition point for power lines and other wiring and cables (hereinafter "cabling").

Returning to FIG. 13, the system 210 provides an interface between wiring within a doorframe as shown in FIG. 10 and the electronic doorframe elements and other electronic elements associated with the door, doorframe or door opening 20. System 210 includes a body structure 230 that has a top area or top wall 32, a bottom area or bottom wall 34, and a plurality of sidewalls 236, 238. The top wall, bottom wall, and sidewalls define a hollow body structure and an interior space 240, as illustrated in FIG. 13 for example. Any cabling or tools used for running and pulling cabling around the doorframe extend through the interior space 240 and then back out the interior space through various openings and ports in order to provide the desirable electrical connections. In that way, system 210 provides access to various sources of power, external systems, and exterior electronic devices that interface with system 210, for certain features and functions of a door system as illustrated in FIG. 10.

Figure 15:
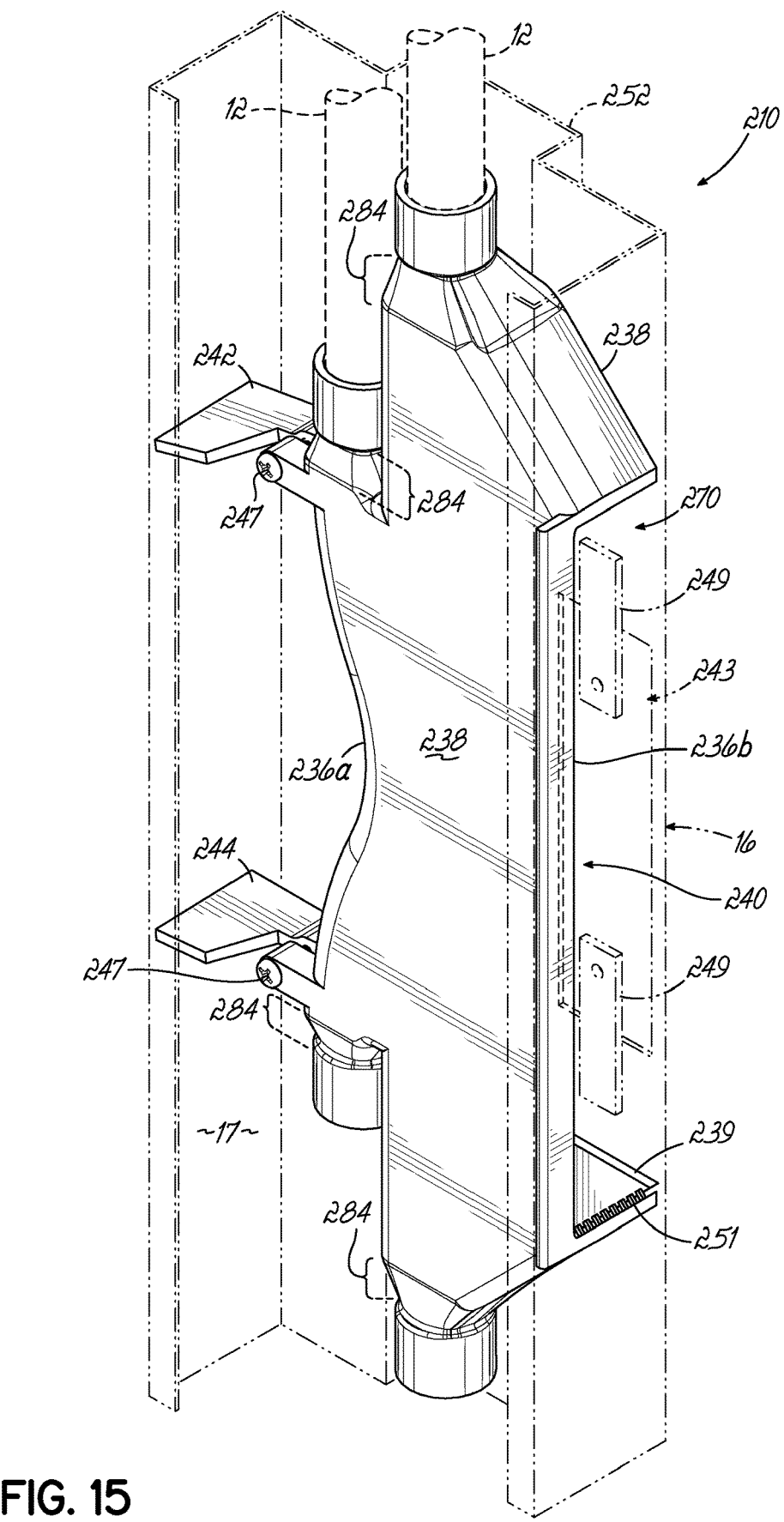
FIG. 15 is another perspective view of the embodiment as in FIG. 13 incorporated within a doorframe.

System 210 of the present invention is configured for fitting into and working with a hollow doorframe that has flat or planar walls as discussed herein. The cross-section of a typical doorframe 216 is illustrated in FIG. 13 and is generally a hollow frame formed of a suitable material, such as metal and is configured to abut up against a masonry wall 218 as shown in FIG. 10. System 210 fits inside of doorframe 216 as illustrated in FIGS. 13, 15. To that end, the body structure includes one or more generally planar or flat sidewalls 238 to interface with a doorframe 216 as shown in FIG. 13.

The system 210, in one embodiment, incorporates elements for securing the body structure 230 in the frame. As illustrated in FIGS. 13-16, system 210 incorporates one or more paddles 242, 244 that rotate about an axis 245. The axis 245 might be formed by a threaded screw 247 (see FIG. 15) that may be rotated to rotate the paddles 242, 244 up against the doorframe to wedge against the doorframe as shown in the FIGS. 13, 15 and secure system 210. The paddles rotate to fill the full width of the door frame and then slide up the screw until the paddle pushes agains the back of the frame, thereby securing the body structure to the frame. Other securement methods may be used without deviating from the invention, such as clip structures as discussed herein. The frame structure 216 includes various flat inner and outer surfaces depending on the shape of the frame structure. Generally, each of the paddles will bear against one or more of the inner surfaces 217 of frame structure or frame 216 to secure the body structure 230 within the frame.

In accordance with one embodiment of the invention, as illustrated in FIG. 15, for example, the paddles 242, 244 may be located on sidewalls that are generally opposite a flat sidewall 236b in order to engage the frame 216 and push the sidewalls 236 against the frame to secure the body structure (see FIG. 15). For further positioning system 210 within frame 216, one or more spacers 250 might be used to also secure the body structure 230 against the frame 216. The body structure may be formed of a suitable material such as metal or plastic.

Figure 16:
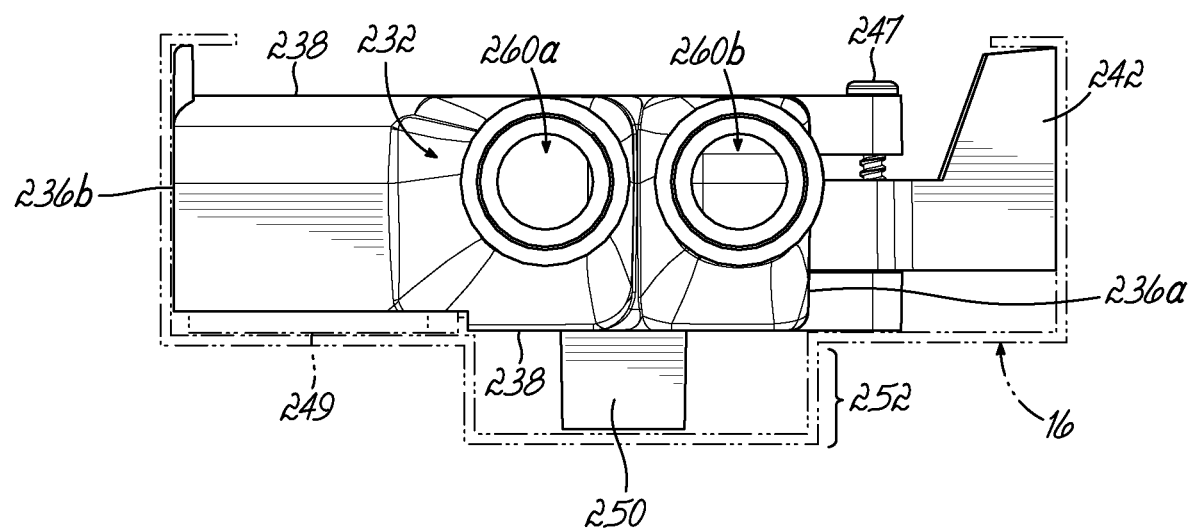
FIG. 16 is a top view of an embodiment of the invention as in FIG. 13.

As illustrated in FIGS. 13, 15-16, generally a doorframe will include a doorstop structures 252 that extends into the door space 220 from the frame. That is, the frame forms a rabbet edge to form doorstop 252. Spacers 250 may extend into doorstop 252 and further support in position the body structure 230 therein for securing its location and position within the doorframe 216 (see FIG. 16). The spacers 250 may be formed of a suitable material that is rigid or flexible as appropriate for ensuring the proper positioning and securement of the body structure 230 in the frame. In one embodiment, the spacers 250 are formed as part of the body structure. In another embodiment, they might be separate from the body structure. As may be appreciated, the paddles and spacers may be sized accordingly depending on the size of the body structure and doorframe.

In another embodiment of the invention, the system may be secured in other ways to the frame as discussed herein. So, the present invention and its use in a doorframe or as part of a frame is not limited to the embodiments shown in the illustrations. As such, the system 210 might also include the frame and one or more body structures as a generally unitary element for installation in a building or structure.

The system 210 of the present invention provides a specific ability to incorporate electronic features into a doorframe and door structure and further provides the ability to direct the appropriate cabling into position for being coupled with one or more of the electronic components. Furthermore, the present invention provides a way to retrofit and add electronic features to a doorframe after installation of the doorframe and door have occurred. To that end, the system 210 incorporates various elements for guiding and directing elongated structures, such as lengths of cable as well as tools for fishing the cable (e.g., Fish tape), into the walls and in and around the doorframe.

Figure 14:
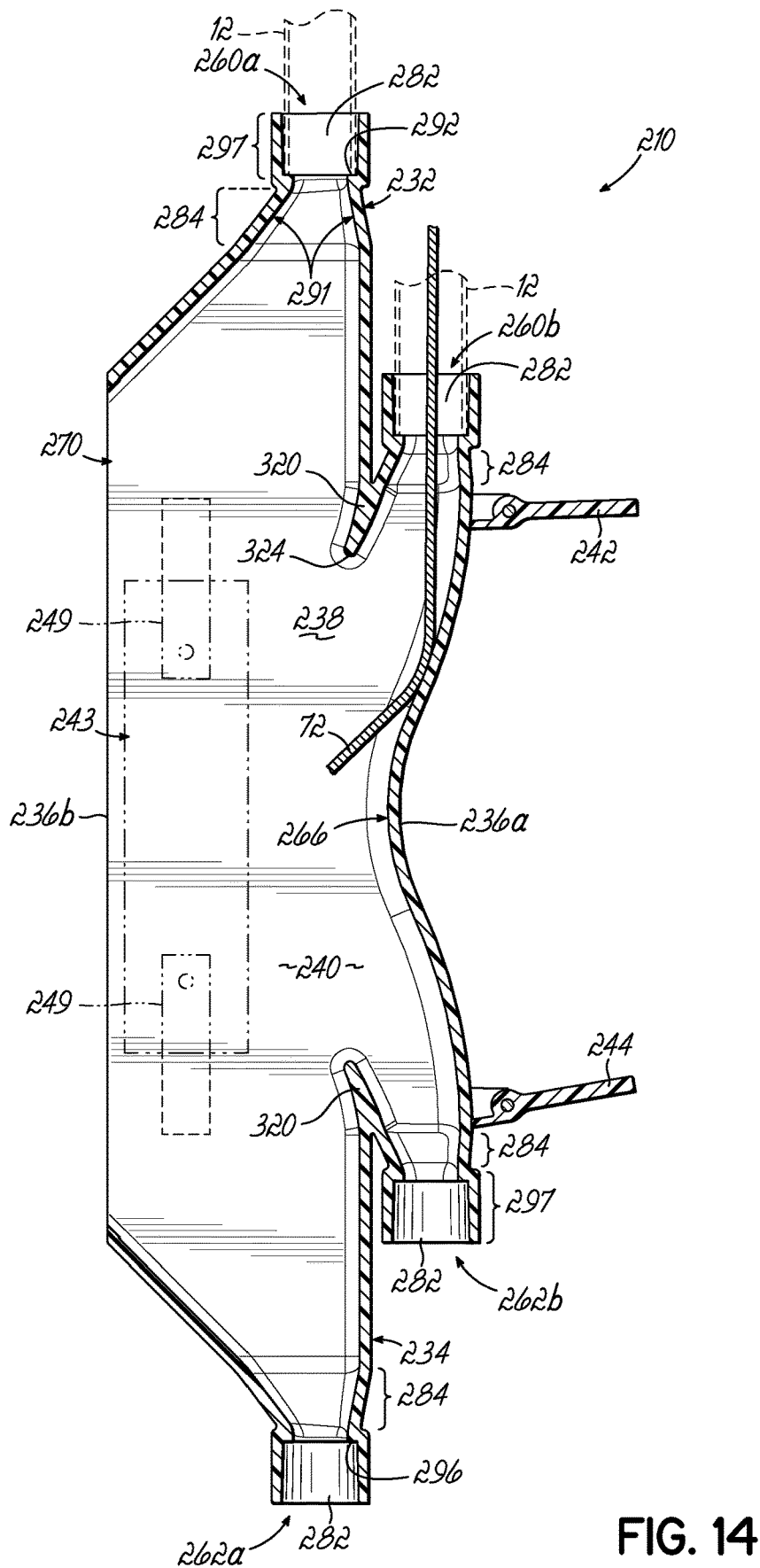
FIG. 14 is a cross-sectional view of an embodiment of the invention as in FIG. 13.

In accordance with one feature of the invention, a plurality of ports 260a, 260b are formed in the top or a top wall 232 of the body structure. Also, a plurality of ports 262a, 262b are formed in the bottom or a bottom wall 234 as illustrated in FIGS. 13-15. Each of the ports opens into the interior space 240 of body structure 230. More specifically, respective ports in the top wall, such as top wall ports 260a, 260b longitudinally aligned in the body structure with respect to bottom wall ports 262a, 262b thus forming a plurality of port pairs at the top and bottom of body structure 230. For example, port 260a is longitudinally aligned with 262a to form a port pair and port 260b is longitudinally aligned with port 262b for forming another port pair. The embodiment illustrated in the figures shows two port pairs, although a lesser or greater number might be implemented in the invention. Also, the ports are shown staggered in height on body structure 230 so that at least one of the ports is above another of the ports in the body structure. More specifically, port 260a in the top wall 232, is higher than port 260b. Similarly, along the bottom wall 234, the port 262a is lower than port 262b. Such staggering provides for proper positioning of conduit in certain positions along the door frame. For example, referring to FIG. 10, when systems, such as system 10 and/or 10b are installed at the head of the frame, radiused conduit from the side of the frame will transition into the system. With a setback port, such as port 260b, standard radiused conduit may be installed into that setback port of a system in the head of the frame and the conduit will roll down into the side of the frame, and still remain within the depth of the frame. In that way, the invention prevents the creation of a conflict with the conduit and the masonry that is installed against the frame.

The present invention further includes various features for directing any cabling or cabling tools through the interior space 240 and into and through various ports depending upon where the cabling is to be directed. To that end, system 210 incorporates a diverter or diverter surface 266 in the form of a curved diverter wall or sidewall as illustrated in the cross-sectional view of FIG. 14. Diverter surface 266 is positioned to extend into the interior space 240 and extends in the interior space inwardly from one sidewall 236a and toward another sidewall 236b that is opposite or opposing sidewall 236a. Diverter 266 also spans along the length of body structure 230 between a port pair, such as port pair 260b, 262b as illustrated in FIG. 14. More specifically, a portion of the sidewall 236a is curved inwardly in the body structure and forms the diverter surface 266 which includes an inside surface of the curved sidewall portion. The surface extends in the interior space and slopes from one side of the body proximate a port of a port pair and extends toward an opposing side of the body and then slopes back to the one side proximate to the other port of the port pair (see FIG. 14). The diverter surface 266 forms part of the sidewall 236a and is configured for directing an element that extends through a port of the port pair toward an area in the body structure.

That is, diverter surface 266 diverts cabling/tools passing through the ports 260b, 262b in different directions. The diverter surface 266 is configured for directing cabling/tools that come through either port 260b or 262b over to an area in space 240 that overlaps with an opening 270 that is formed in the body structure 230 as shown in FIG. 14.

Referring to FIGS. 13-15, opening 270 might be formed in one of the sidewalls 238 and/or one of sidewalls 236 to provide access to the interior space 240. For example, referring to FIGS. 13-15, opening 270 is formed in sidewalls 238, 236b to generally align with or extend between the port pair 260a, 262a but is spaced from port pair 260b, 262b. Since opening 270 will provide access to the interior space 240, it is desirable that cables and/or tools that are being pushed or pulled through the conduit are directed to the opening 270 for easier access by an installer. In one disclosed embodiment, the opening 270 is formed such that a portion of the opening is positioned in a sidewall 236b that is opposite to the sidewall 236a that forms the diverter surface 266. To that end, the diverter surface 266 will guide and direct cables/tools entering the interior space 420 through port 260b or 262b toward the opening 270. Similarly, any cables/tools directed though opening 270 and toward the side of the body structure containing ports 260b, 262b, will be diverted in the direction of those ports. The opening 270 is formed in the sidewalls and in accordance with one embodiment of the invention, the sidewalls have removable portions for expanding the opening. In particular, referring to 13 and 15, the sidewall 238 might include one or more removable portions 239 that may be removed to accommodate openings in the door frame 243, such as when the opening 243 is of a similar or same size to the opening 270 in the system 210. The frame openings 243 are for the mounting of electrical hardware and may include mounting brackets 249 that are fixed in the inside of the frame, such as by welding. The length of the frame opening 243 may vary in different installations and might be as large as the opening 270. For example, the opening shown in FIG. 13 may be suitable for devices such as a door position switch or electric strike. But if an electric power transfer device is used, a larger opening might be necessary as the mounting brackets 249 might be in conflict with the opening and sidewall. To that end, the portions 239 may need to be removed so that the brackets 249 can remain in place and proper clearance is provided. To that end, the removable portions 239 might include a weakened area in the sidewall, such as serrations or teeth 251, that will break for removal of the portions 239. Such portions are shown as triangular portions but can take any appropriate shape.

For example, as illustrated in FIG. 14, an exemplary cable 72 is illustrated passing through port 260b and being directed toward opening 270 by the diverter surface 266. As illustrated, the diverter works in both directions for cables and tools being directed through the various ports to intercept the diverter surface 266 or being diverted into the opening 270 and into a port. In one particular embodiment of the diverter surface 266 as illustrated, the diverter surface is in the form of a curved wall that extends in the interior space 240. Diverter surface 266 defines a surface that slopes from the sidewall 236a at one port such as port 260b along a sloping portion and toward the opposing sidewall 236b (See FIG. 14.) The diverter surface 266 then has a peak and slopes back to the sidewall 236a and proximate to the other port 262b. In that way, the diverter surface works in both directions so that any cable/tool entering either port 260b or 262b is diverted or directed toward opening 270. In that way, the end of the cable or tool will then be readily accessible to an installer. Any cabling/tool entering through opening 270 can be guided to the ports 260b, 262b by diverter 266. Cable 272 may be coupled to suitable electronic hardware. Alternatively, the end of the cable 272 might be directed to one of the other ports to continue through system 210 to its termination point. The diverter surface 266 is formed as a generally smooth, curved portion of the sidewall to form one smooth curve that extends from the sidewall 236a toward sidewall 236b, then back to sidewall 236a to provide diversion of elements entering or exiting port 260b, 262b.

In accordance with another feature of the invention, each of the ports 260a, 260b and 262a, 262b as illustrated in FIG. 14 will include an opening 282. Transition portions 284 are formed by the top and bottom walls 232, 234 around the openings. The transition portions 284 are sloped transition portions, as illustrated, and slope from the interior space 240 of the body structure to the various port openings 282. Depending on the construction of the top wall 232 and bottom wall 234, the sloped transition portions 284 may have interior surfaces that curve smoothly toward the openings 282 (see FIG. 14). The sloped transition portions 284 are configured for guiding the end of a cable or tool toward and into the opening 282 and thus out of the respective port without getting blocked or otherwise hung up within the interior space of the body structure 230. In that way, cables may be pushed or pulled through the various ports with greater ease and efficiency without getting hung up. In one illustrative embodiment, as shown in FIG. 14, the diverter surface 266 terminates generally proximate to the various sloped transition portions 284 at the ports 260b, 262b. This further ensures a smooth transition between cables being moved through the interior space that engage the diverter surface 266 and one or more of the sloped transition portions 284.

Referring to the cross-sectional view of FIG. 14, the inner surfaces 291 of the sloped transition portions 284 are generally smooth. In one embodiment, the inner surfaces may be essentially in the form of smooth conical surfaces that taper or transition to the openings 282. That is, the inner surfaces 291 transition smoothly to the beginning 292 of the respective openings 282 so that there are no edges or discontinuities presented to a cable or tool that is moving into respective ports. As discussed with respect to other embodiments, the openings have an inner diameter $D_I$ and on the other side of the opening 282 the port increases in diameter to a conduit diameter $D_c$ to receive the end of conduit 212, depending upon the size of the conduit. More specifically, the port includes a collar portion 297 that is configured for receiving an end of the electronic conduit. The collar 297 may be formed as part of or an extension of body structure 230. The difference in diameter or size between $D_I$ of the opening 282 and $D_c$ for the collar portion 297 of the port that receives the conduit end provides a seat 96 that stops the insertion of the conduit end into the port opening and thus seats the conduit in the port. Referring you FIG. 14, the inner diameter $D_I$, in one embodiment of the invention, is essentially sized to be close to or similar to the inner diameter of the electrical conduit. According to the embodiment of the invention, the system 210 and the various elements, such as the ports 260a-262b can be configured for receiving ½ inch conduit or three-quarter inch or larger conduit. The system of the invention can be utilized with PVC or metal conduit as appropriate. Generally, the collar portion 297 of the body structure would it be dimensioned a suitable length L for providing a sufficient securement and proper seating of the conduit end as it transitions into the body structure 230.

In accordance with another feature of the invention, a transition wall 320 is positioned between two ports of the plurality of ports that are formed in one of the top/top wall or the bottom/bottom wall. The wall 320 extends into the interior space 240 for separating the ports beyond the sloped transition portions 284. (See FIG. 14.) The transition wall 320 provides further direction to a cable or tool that is inserted in the opening 270 and directed to one of the respective ports. To that end, the wall 320 may be angled or sloped toward the opening 270 as shown in FIG. 14 to further facilitate directing a cable or tool from the ports into the opening. As illustrated in FIG. 14, the transition wall 320 is positioned at the top of the body structure as well as the bottom of the body structure. The angled wall angles away from the diverter surface and expands the distance between the diverter surface 266 and the walls 320 so that the cable or tool may be directed into a port 260*b*, 262*b*. This further increases the ease in which the ports that are more distant from opening 270 may be accessed. The walls 320 also include a curved or rounded end 324 for providing protection and smooth traveling of a cable or tool, such as between the two bottom wall ports 262*a*, 262*b*. For example, it may be desirable to receive a cable or tool into the body structure through port 262*a*, and then direct that cable or tool back out of the system through port 262*b*. As such, the cable or tool would have to be bent over the wall 320 to extend between the port 262*a*, 262*b*. The curved end 324 allows for cable or tool to transition between the ports and to wrap around the end 324 without causing damage or breakage in the wiring or the tool.

Depending upon the installation and use of the system 210, as illustrated in the Figures, one or more caps may be implemented with the system in order to cover the ports and the openings defined thereby and to keep mortar and other debris out of the body structure and interior space. (See FIG. 1.)

Referring again to FIGS. 3-5 and 10, the system 210 of the invention will generally be installed into a doorframe 16, which maybe a hollow metal frame structure as is noted similar to the installation of system 10 and various other systems as described herein to provide the advantages of the invention. Furthermore, the embodiments of FIGS. 13-16 might incorporate various of the features in the embodiment of FIGS. 7-13 as appropriate.

While the present invention has been illustrated by the description of the embodiments thereof, and while the embodiments have been described in considerable detail, it is not the intention of the Applicant to restrict or in any way limit the scope of the appended claims to such detail. Additional advantages and modifications will readily appear to those skilled in the art. Therefore, the invention in its broader aspects is not limited to the specific detail representative apparatus and method, and illustrative examples shown and described. Accordingly, departures may be made from such details without departure from the spirit or scope of Applicant's general inventive concept.

What is claimed:

1. A system for providing electronic features in a doorframe comprising:
   a body structure having a top, a bottom and sides defining an interior space of the body structure;
   a plurality of ports formed in the top and a plurality of ports formed in the bottom of the body structure, each port opening into the interior space;
   the top ports being positioned generally opposite respective bottom ports in the body structure to form port pairs;
   a diverter surface extending into the interior space between the ports in the top and bottom of the body structure;
   the diverter surface including a portion sloping into the interior space from a side of the body proximate at least one top port and a portion sloping into the interior space from proximate at least one bottom port of the body structure and configured for directing an element extending through a port of one port pair toward a port of a different port pair.

2. The system of claim 1 wherein the body structure includes a plurality of sidewalls, at least one of the sidewalls being curved inwardly in the body structure to form the diverter surface.

3. The system of claim 1 wherein the diverter surface is a continuous surface forming the sloping portions on a side of the body.

4. The system of claim 1 wherein at least one of the plurality of ports is located above another of the plurality of ports in the body structure.

5. The system of claim 1 wherein the body structure includes a plurality of sidewalls, at least one of the sidewalls being generally planar for fitting against a surface of a door frame.

6. The system of claim 2 further comprising at least one opening formed in a sidewall of the body structure for providing access to the interior space, a portion of the at least one opening positioned in a sidewall opposite to the sidewall forming the diverter surface.

7. The system of claim 1 further comprising a wall positioned between two adjacent ports of the plurality of ports formed in one of the top or bottom of the body structure, the wall extending into the interior space for separating the ports.

8. The system of claim 1 wherein at least one port includes a port opening and a sloped transition portion, the sloped transition portion sloping from the interior space of the body structure and to the port opening.

9. The system of claim 1 wherein at least one port is configured for receiving an end of electrical conduit and includes a seat that is configured for seating with the electrical conduit end.

10. A system for providing electronic features in a doorframe comprising:
    a body structure including a top, a bottom and sides defining an interior space of the body structure;
    at least one port formed in the top of the body structure and at least one port formed in the bottom of the body structure, each port opening into the interior space;
    the at least one top port being positioned generally opposite the at least one bottom port in the body structure;
    a diverter surface extending into the interior space between the ports in the top and bottom of the body structure;
    the diverter surface including a solid surface portion sloping into the interior space from a side of the body proximate the at least one top port and a solid surface portion sloping into the interior space from proximate the at least one bottom port of the body structure;
    the diverter surface configured for smoothly directing an element that extends through a port toward an area in the interior space of the body structure,
    at least one an opening formed in at least a side of the body structure, the at least one opening extending along the body structure and across from each sloping portion of the diverter surface for providing access to the area in the interior space proximate to each of the ports and respective portions of the diverter surface to access an element extending from either port.

11. The system of claim 10 wherein the at least one top port is positioned opposite the at least one bottom port for forming a port pair, the diverter surface sloping portions configured for directing an element extending through a port.

12. The system of claim 10 wherein the body structure includes a plurality of sidewalls, at least one of the sidewalls being curved inwardly in the body structure to form the diverter surface.

13. The system of claim 10 wherein the diverter surface is a continuous surface and includes a portion that slopes from one side of the body proximate a port and toward an opposing side of the body and a portion that slopes back to the one side proximate to the other port.

14. The system of claim 10 wherein the body structure includes a plurality of sidewalls, at least one of the sidewalls being generally planar for fitting against a surface of a door frame.

15. The system of claim 12 wherein a portion of the at least one opening is positioned in a sidewall opposite to the sidewall forming the diverter surface.

16. The system of claim 10 wherein at least one port includes a port opening and a sloped transition portion, the sloped transition portion sloping from the interior space of the body structure and to the port opening.

17. The system of claim 10 wherein at least one port is configured for receiving an end of electrical conduit and includes a seat that is configured for seating with the electrical conduit end.

18. A door frame for providing electronic features comprising:
   a frame structure;
   a body structure secured in the frame structure and including a top, a bottom and sides defining an interior space of the body structure;
   at least one port formed in the top of the body structure and at least one port formed in the bottom of the body structure, each port opening into the interior space;
   the at least one top port being positioned generally opposite the at least one bottom port in the body structure;
   a diverter surface extending into the interior space between the ports in the top and bottom of the body structure;
   the diverter surface including a portion sloping into the interior space from proximate the at least one top port and a portion sloping into the interior space from proximate the at least one bottom port of the body structure;
   the diverter surface configured for directing an element that extends through a port toward an area in the interior space of the body structure.

19. The door frame of claim 18 wherein the body structure includes a plurality of sidewalls, at least one of the sidewalls being curved inwardly in the body structure to form the diverter surface.

20. The door frame of claim 18 wherein the diverter surface is a continuous surface and includes a portion that slopes from one side of the body proximate a port and toward an opposing side of the body and a portion that slopes back to the one side proximate to the other port.

\* \* \* \* \*